United States Patent [19]
Yamamoto

[11] Patent Number: 5,923,337
[45] Date of Patent: Jul. 13, 1999

[54] SYSTEMS AND METHODS FOR COMMUNICATING THROUGH COMPUTER ANIMATED IMAGES

[75] Inventor: Minoru Yamamoto, Yokohama, Japan

[73] Assignee: Image Link Co., Ltd., Japan

[21] Appl. No.: 08/636,874

[22] Filed: Apr. 23, 1996

[51] Int. Cl.$^6$ .................................................. G06T 11/00
[52] U.S. Cl. ........................................................... 345/473
[58] Field of Search ............................................. 345/473

[56] References Cited

U.S. PATENT DOCUMENTS

| | | | |
|---|---|---|---|
| 5,630,017 | 5/1997 | Gasper et al. | 345/473 |
| 5,649,086 | 7/1997 | Belfer et al. | 345/473 |

OTHER PUBLICATIONS

Pelachaud et al., "Rule–Structured Facial Animation System", *IJCAI–93: Proc. of 13t Intl. Conf. on Artificial Intelligence*, v. 2, pp. 1610–1615, Dec. 1993.

Pelachaud et al., "Correlation of Facial and Vocal Expressions for Facial Animation", *Informatique '92*, pp. 95–110, Mar. 1992.

Griffin et al., "FERSA: Lip–Synchronous Animation", $3^{rd}$ Intl. Computer Science Conference (ICSC '95), pp. 528–530, Jan. 1995.

Morishima et al., "A media conversion from speech to facial image for Intelligent man–machine interface", *IEEE J. on Selected Areas in comm.*, v.9, n. 4, pp. 594–600, May 1991.

Lavagetto et al., "Lipreadable frame animation driven by speech parameters", *1994 Intl. Symposium on Speech, Image Processing, and Neural Networks*, pp. 626–629, Apr. 1994.

Lavagetto, Converting Speech into Lip Movements: a multimedia telephone for hard–of–hearing people, *IEEE Transactions on Rehabilitation Engineering*, v. 3. n. 1, pp. 90–102, Mar. 1995.

Lavagetto, "Speech Articulatory Analysis through time delay networks ", $2^{nd}$ New Zealand Intl.Two–Stream conf. on Artificial Neural Networks + Expert Systems, pp. 306–309, Nov. 1995.

Pelachaud et al., "Generating Facial Expressions for Speech", *Cognitive Science*, v. 20, pp. 1–46, Jan. 1996.

Morishima et al., "Facial Expression Synthesis Based on Natural Voice for Virtual Face–to–Face Communication with Machine ", IEEE Virtual Reality Annual International Symposium, pp. 486–491, Sep. 1993.

Nakagawa et al., "An Experimental PC–based Conversion System from Text to Talking Images—Addition of Blinking" , Technical Report of IEICE IE92–131, PRU92–154, Mar. 1993.

Dysart, "VR goes to Hollywood" , Virtual Reality World, v.2, n. 6, pp. 18–23,Nov.1994.

Girard,"D.A.V.O.S.: A Computerized Videodisc animation with synchronized speech", Graphics Interface '88, pp. 97–104, Jun. 1988.

*Primary Examiner*—Joseph R. Burwell
*Attorney, Agent, or Firm*—Knoble & Yoshida LLC

[57] ABSTRACT

The current method and system generates an animation sequence for a live character during communication. In response to a performer's voice and other inputs, the animation sequence of the character is generated on a real-time basis and approximates human speech. The animated character is capable of expressing certain predetermined states of mind such as happy, angry and surprised. In addition, the animated character is also capable of approximating natural movements associated with speech.

21 Claims, 26 Drawing Sheets

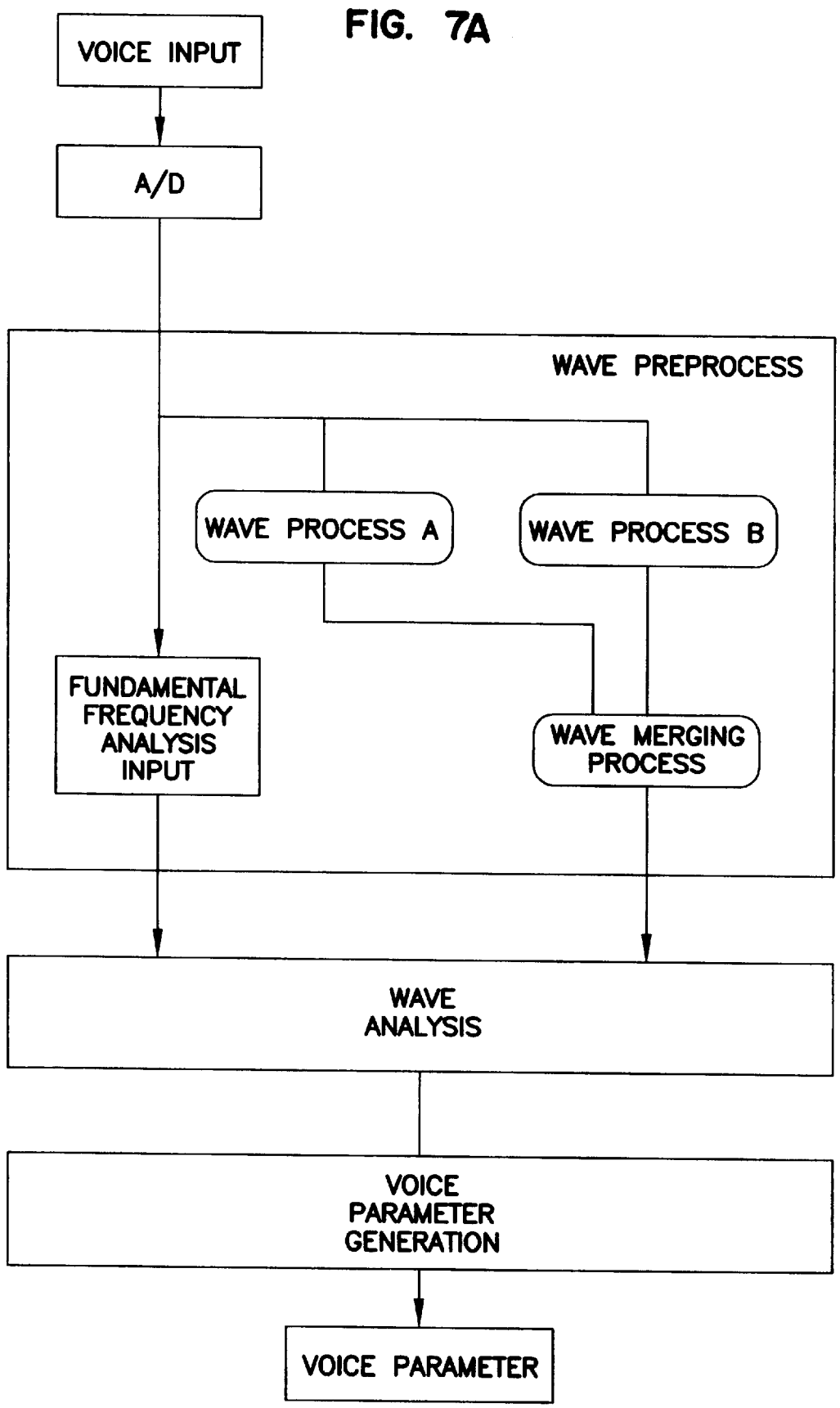

SYSTEMS AND METHODS FOR COMMUNICATING THROUGH COMPUTER ANIMATED IMAGES

FIELD OF THE INVENTION

The current invention is generally related to a user-controlled real-time computer animation for communicating with a viewer and is particularly related to a character image animated according to user voice and other inputs.

BACKGROUND OF THE INVENTION

In the field of computer-graphics, a character has been animated for various purposes. Whether or not the character be a human, an animal or an object, computer scientists and computer-graphics animators have attempted to animate the character as if it is capable of communicating with a viewer. At the infancy of computer graphics, the character generally teaches or entertains the viewer in a non-interactive manner without responding to the viewer. As computer graphics has matured, the character had been animated in a slightly interactive manner. To support such an interaction between the character and the viewer, the character image must be animated on a real-time basis.

Despite significant advances in hardware and software, real-time character animation is still a difficult task. Among various images to be animated, character, human or otherwise, generally requires complex calculations at a high speed for rendering a large number of image frames. In particular, to communicate with a viewer in an interactive manner, the character animation must be able to synchronize its lip movement with an audio output as well as to express complex motions. To accommodate such complex high-speed calculations, an expensive animation system including a high-performance processor is necessary. In addition, the complex input sub-system for inputting various information such as lip movements, limb movements and facial expressions are also necessary.

In the attempts to solve the above-described problems, the VACTOR™ system, includes a high-performance three-dimensional rendering unit along with a complex input sub-system. An character image is rendered on a real-time basis based upon the inputs generated by a special sensor gear that a performer wears. The special sensor gear includes a position sensor placed around the lips of the performer, and certain exaggerated mouth movements generate desired mouth position signals. The performer also wears another set of position sensors on limbs for signaling certain limb movements. However, it has been reported that these position sensor gears are not ergonomically designed and requires a substantial amount of training to generate desired signals. Furthermore, the cost of the VACTOR™ system is beyond the reach of most commercial enterprises and let alone individual consumers.

On the other hand, certain prior art two-dimensional animation systems do not generally require the above-described complex hardware and software and are usually affordable for the lack of realistic animation. For example, a two-dimensional character image is animated based upon the presence or the absence of a voice input. In this simplistic system, the mouth is animated open and closed during the voice input, and the animation is terminated when there is no more voice input. To animate the mouth, animation frames depicting the open mouth and the closed mouth is stored in an animation database, and upon the receipt of the voice input, an animation generator outputs the above-described animation frames to approximate the mouth movement in a crude manner. In other words, since this system has the same monotonous open and close mouth movement in response to various voice patterns, the animated character image fails to appear interactive. Furthermore, the image character generally fails to produce facial expressions.

As described above, the prior attempts have not yet solved the cost performance problem for a real-time animation system capable of generating a lively character image for communicating with a viewer using generally available personal computers such as IBM-compatible or MacIntosh. A method and a system of generating a real-time yet lively character image on a widely available platform would substantially improve a cost performance relation that the above-described prior attempts had failed.

The animation system satisfying the above-described cost performance relation has a wide variety of application fields. In addition to traditional instructional and entertainment applications, for example, such a character animation system may be used to promote products at trade shows, author a short animation for various uses such as games and broadcasting, as well as to interface an end user. The image character animation may be authored in advance of the use or may be generated in response to a viewer response in an interactive manner.

SUMMARY OF TEE INVENTION

To solve the above and other problems, according to a first aspect of the current invention, a computer graphics system for generating an animation sequence for a character in response to an input, includes an animation database unit for storing predetermined animation frames of the character, a sequence of the animation frames generating movements associated with communication; an animation status storage unit for storing a predetermined set of last input parameters; an input analyzer connected to the animation status storage unit for analyzing the input so as to determine the predetermined set of current input parameters in relation to the last input parameters, the input analyzer updating the last input parameters by the current input parameters; and an animation generator connected to the input analyzer for selecting a sequence of the animation frames based upon the current parameters so as to generate the animation sequence of the character.

According to a second aspect of the current invention, a computer graphics system for generating an animation sequence for a character in response to an input, includes an animation database unit for storing predetermined animation frames of the character, a sequence of the animation frames generating movements associated with communication; a character profile storage unit for storing a predetermined set of character profile parameters, the character profile parameters characterizing the character during the communication; an input analyzer connected to the character profile storage unit for analyzing the input so as to determine a predetermined set of current input parameters in relation to the character profile parameters; and an animation generator connected to the input analyzer for selecting a sequence of the animation frames based upon the current parameters so as to generate the animation sequence of the character.

According to a third aspect of the current invention, a computer graphics system for generating an animation sequence for a character in response to a voice input, includes an animation database unit for storing predetermined animation frames of the character, a sequence of the animation frames generating movements associated with oral communication, the movements including lip movements which approximate those of human speech; an input analyzer unit for analyzing the voice input so as to determine a predetermined set of input parameter values; and an animation generator connected to the input analyzer for selecting a sequence of the animation frames based upon the input parameter values so as to generate the movements of the character associated with the voice input.

According to a fourth aspect of the current invention, a virtual puppet system for animating a character on the fly on a display based upon an input, includes a facial expression unit for selecting a facial expression from a predetermined set of expressions based upon the input, the facial expression unit generating a facial expression signal; a facial orientation unit for selecting an orientation of a face of the character from a predetermined set of orientations with respect to the display based upon the input, the facial orientation unit generating a facial orientation signal; an input voice analyzing unit for analyzing the input for determining an input voice signal; and an animation generation unit connected to the facial expression unit, the facial orientation unit and the input voice analyzing unit for generating an animation sequence of the character based upon the facial expression signal, the facial orientation signal and the input voice signal, the facial expression signal, the facial orientation signal, the facial expression and the input voice signal being defined as current parameters.

According to a fifth aspect of the current invention, a virtual puppet system for animating a character on the fly to communicate with an audience, includes a character presentation unit for displaying the character to the audience; an audience response surveying unit for surveying an audience response to the character presented by the character presentation unit; an operator console having a voice input unit for generating an input voice signal based upon a voice input of an operator, a keypad for generating an expression signal so as to specify a character animation sequence; and an animation generating unit connected to the operator console and the character presentation unit for generating the animation sequence of the character based upon the input voice signal and the expression signal.

According to a sixth aspect of the current invention, an input voice analyzing unit for analyzing a digitized voice input, includes a wave processing unit for generating a plurality of frequency shifted waves based upon the digitized voice input, the wave processing unit adding the frequency shifted waves so as to generate an enhanced wave; a wave analysis unit connected to the wave processing unit for analyzing the enhanced wave so as to determine predetermined intermediate parameters; and a voice parameter generation unit connected to the wave analysis unit for generating a voice parameter set based upon the intermediate parameters, the voice parameter set indicating an increased sensitivity level for detecting a volume change of the voice input over a unit time.

According to a seventh aspect of the current invention, a method of generating an animation sequence for a character in response to an input, includes the steps of a) storing predetermined animation frames of the character, a sequence of the animation frames generating movements associated with communication; b) analyzing the input so as to determine the predetermined set of current input parameters in relation to the last input parameters, c) updating last input parameters by the current input parameters; and d) selecting a sequence of the animation frames based upon the current parameters so as to generate the animation sequence of the character.

According to an eighth aspect of the current invention, a method of generating an animation sequence for a character in response to an input, includes the steps of a) storing predetermined animation frames of the character, a sequence of the animation frames generating movements associated with communication; b) storing a predetermined set of character profile parameters, the character profile parameters characterizing the character during the communication; c) analyzing the input so as to determine a predetermined set of current input parameters in relation to the character profile parameters; and d) selecting a sequence of the animation frames based upon the current parameters so as to generate the animation sequence of the character.

According to a ninth aspect of the current invention, a method of generating an animation sequence for a character in response to a voice input, includes the steps of a) storing predetermined animation frames of the character, a sequence of the animation frames generating movements associated with oral communication, the movements including lip movements which approximate those of human speech; b) analyzing the voice input so as to determine a predetermined set of input parameter values; and c) selecting a sequence of the animation frames based upon the input parameter values so as to generate the movements of the character associated with the voice input.

According to a tenth aspect of the current invention, a method of animating a character on the fly on a display based upon an input, includes the steps of a) selecting a facial expression from a predetermined set of expressions based upon the input; b) selecting an orientation of a face of the character from a predetermined set of orientations with respect to the display based upon the input; c) analyzing the input for determining an input voice parameter; and d) generating an animation sequence of the character based upon the selected facial expression, the selected orientation and the input voice parameter, the selected facial orientation, the selected facial expression and the input voice parameter being defined as current parameters.

According to an eleventh aspect of the current invention, a method of animating a character on the fly to communicate with an audience, comprising the steps of a) displaying the character to the audience; b) surveying an audience response to the character as displayed in the step a); c) generating an input voice signal based upon a voice input of an operator and an expression signal so as to specify a character animation sequence; and d) generating the animation sequence of the character based upon the input voice signal and the expression signal.

According to a twelfth aspect of the current invention, a method of analyzing a digitized voice input, includes the steps of a) generating a plurality of frequency shifted waves based upon the digitized voice input; b) adding the frequency shifted waves so as to generate an enhanced wave; c) analyzing the enhanced wave so as to determine predetermined intermediate parameters; and d) generating a voice parameter set based upon the intermediate parameters, the voice parameter set indicating an increased sensitivity level for detecting a volume change of the voice input over a unit time.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 7A and 7B diagrammatically illustrate processes performed by two embodiments for generating and combining the frequency shifted waves in a wave processing unit according to current invention.

DETAILED DESCRIPTION OF THE PREFERRED EMBODIMENTS

Figure 1:
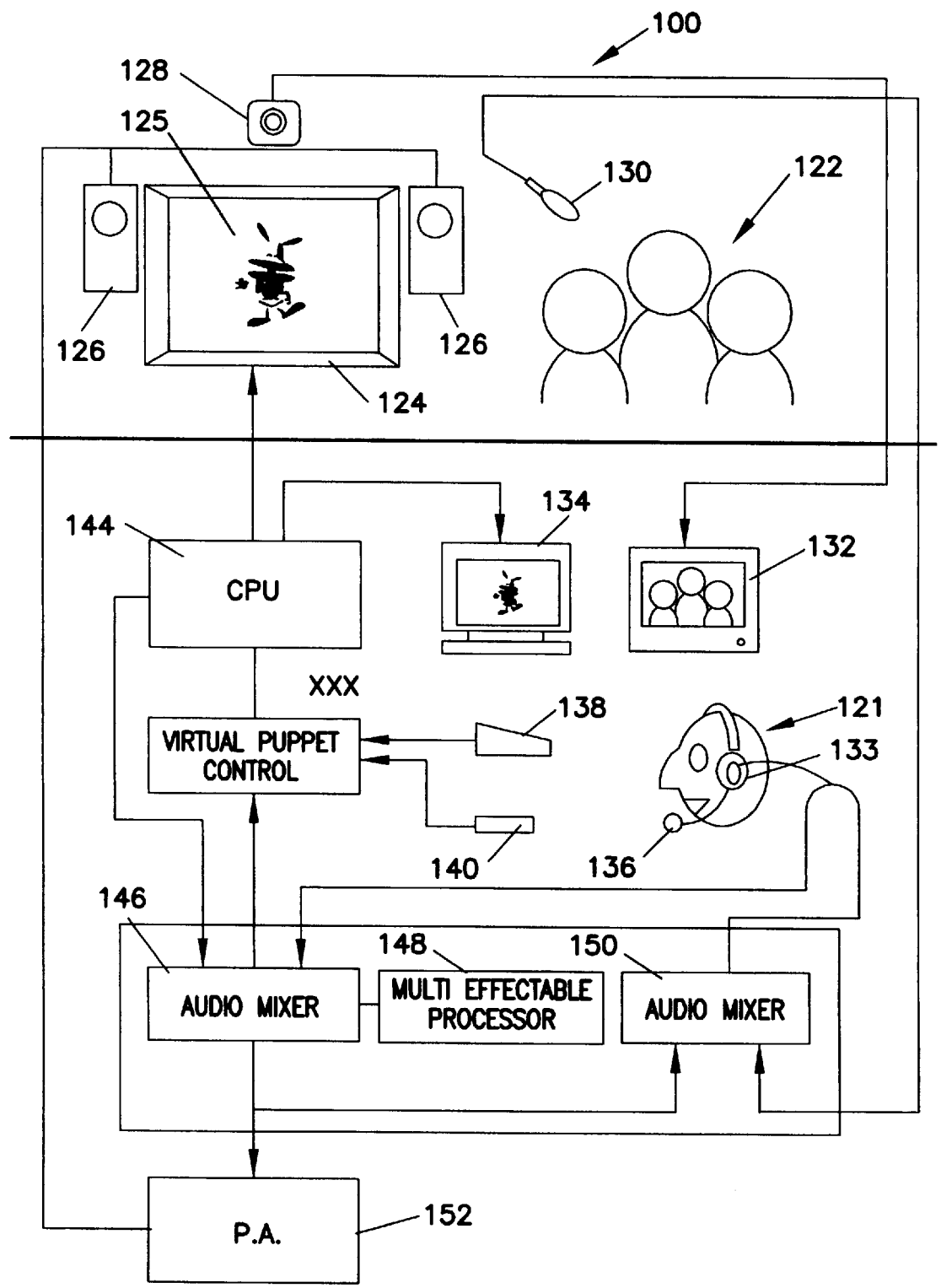
FIG. 1 diagrammatically illustrates a computer graphics system for communicating with an audience through a character which is controlled by an operator according to one preferred embodiment of the current invention.

Referring now to the drawings, wherein like reference numerals designate corresponding structure throughout the views, and referring to FIG. 1, one preferred embodiment of the computer graphics animation system according to the current invention is diagrammatically illustrated. Although the system is used as a real-time presentation tool as well as an authoring tool, the real-time presentation system generally includes a presentation area 100 and a performance booth area 120. In the presentation area 100, a viewer or an audience 122 views an animation image 125 on a presentation display monitor 124 and listens to an audio output via a speaker 126. As the image character 125 is presented, the response of the audience is surveyed by an audience survey camera such as a CCD device 128 and a microphone 130. The surveyed visual and audio responses are sent to the performance booth 120.

The performer 121 generally speaks into a microphone 136. The voice input may be placed in an audio mixer 146 for modifying via a multi-effect processor 148 to be outputted to a public announcement system 152. In any case, the voice input is processed by a central processor 144 to determine a certain predetermine set of parameters for animating the character on the presentation display 124. In determining the animation, a controller 142 also polls additional input devices such as a control pad 138 and a foot switch 140. These input devices provides additional input signals for determining the animation sequence. For example, the additional input signals indicate expressions of the character such as anger, happiness and surprise. In addition, the additional input signals also indicate the orientation of the face with respect to the audience. The character 125 may be looking towards right with respect to the audience. Based upon the above-described input signals, the character 125 is animated in a lively manner.

Still referring to FIG. 1, the performer 121 is generally located in the performance booth 120, and the audience 122 is not usually aware of the presence. The performer 121 communicates with the audience 122 through the character 125. Although the audience cannot see the performer 121, the performer 121 can see and hear the audience through a monitor 132 and a head set 133 via an audio mixer 152 according to the above-described surveying devices. In this way, the performer 121 and the audience 122 interactively engage in a conversation. This interaction is not only spontaneous and natural, but also creative. The animation character is virtually anybody and anything including an animal, an object and a cartoon character.

Figure 2:
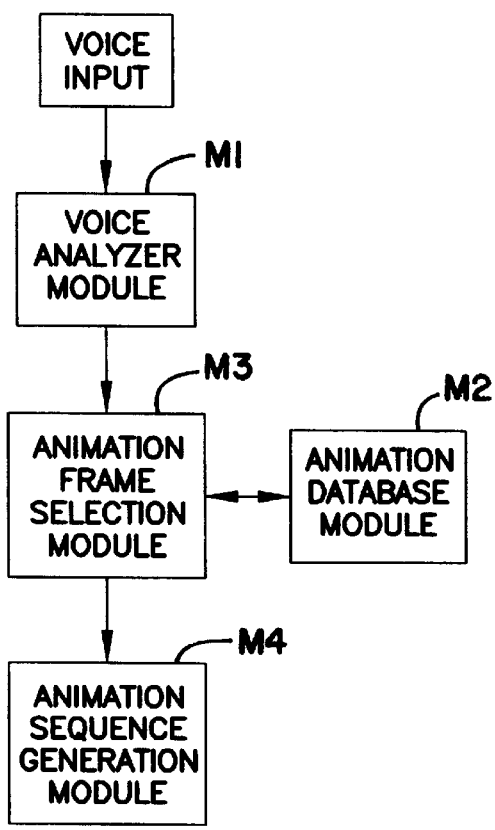
FIG. 2 is a system diagram illustrating certain basic components of one preferred embodiment according to the current invention.

Now referring to FIG. 2, a block diagram illustrates one preferred embodiment of an animation system according to the current invention. A voice analyzer module M1 analyzes a voice input and generates a voice parameter. In response to the voice parameter, an animation frame selection module M3 selects appropriate animation frames from an animation database module M2. To generate a desired animation sequence, an animation sequence generation module M4 outputs the selected animation frames in a predetermined manner. According to this preferred embodiment, the animation database module M2 includes a predetermined number of animation frame sequences which are organized base upon the voice parameter. One preferred embodiment of the detailed organization according to the current invention will be later described with reference to FIG. 21.

Figure 3:
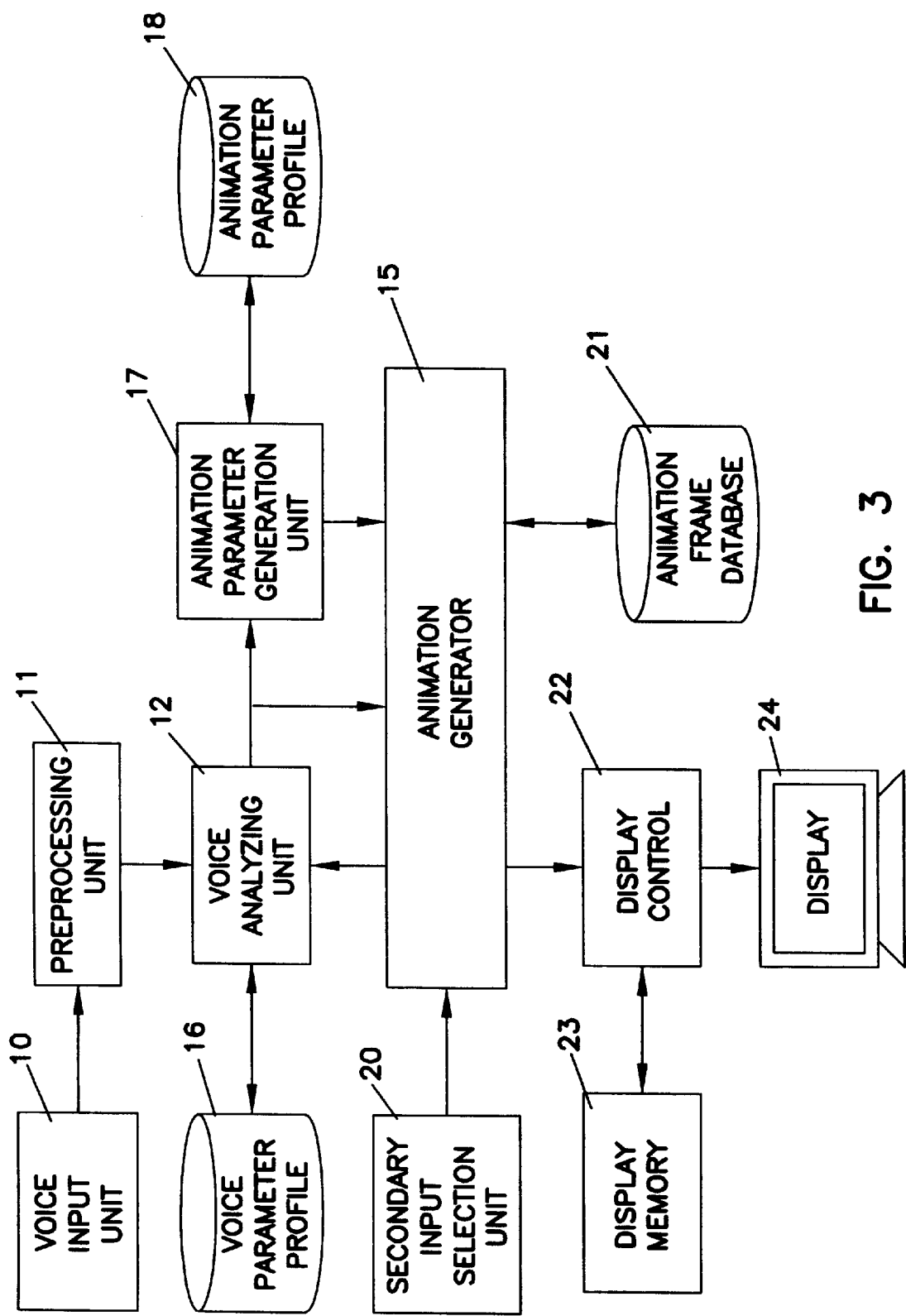
FIG. 3 further illustrates some detailed as well as additional components of another preferred embodiment of the computer graphics system according to the current invention.

Referring to FIG. 3, a block diagram illustrates a second preferred embodiment of an animation system according to the current invention. A voice input is inputted into the system via a voice input unit 10 and is amplified or filtered by a preprocessing unit 11 before outputting to a voice analyzing unit 12. The voice analyzing unit 12 analyzes the voice input so as to determine a volume parameter, a volume change parameter, a pitch parameter and a pitch change parameter. Upon receiving a trigger signal from an animation generator 15, the voice analyzing unit 12 adjusts the values of the above-described voice parameter set according to a voice parameter profile 16, which includes adjustment values for adjusting a predetermined characteristic of the voice input. For example, the voice parameter profile values correct a difference in frequency range between a female voice input and a male voice input. This is because female voice generally ranges from approximately 250 Hz to approximately 500 Hz while male voice generally ranges from approximately 200 Hz to 400 Hz, and the higher frequency range is more easily detected for a volume change.

Still referring to FIG. 3, the adjusted voice parameters are sent to an animation parameter generation unit 17. As similar to the voice parameter adjustment, the animation generation unit 17 also adjusts the animation parameter using an animation parameter profile 18 which includes character specific information. [provide an example for animation parameter profile] The adjusted animation parameter is outputted to the animation generator 15. The animation generator in turn polls a secondary input selection unit such as a key pad or a foot switch to collect additionally specified information for generating an animation sequence. As described above, the additional information includes expressions such as anger, happiness, surprise and other facial or bodily expressions. In addition, the secondary information also includes the orientation of the face of the character with respect to the viewing audience such as right, center or left. Upon receiving the adjusted animation parameters along with the secondary information, the animation generator 15 retrieves a desired sequence of animation frames from an animation frame database 21. Finally, the animation generator 15 outputs the animation frames to a display 24 via a display control 22 and a display memory 23.

According to a preferred embodiment according to the current invention, both the voice analyzing unit 12 and the animation generator 15 for polling the secondary input selection unit 20 are capable of sampling at approximately 60 times a second. However, the animation generator 15 retrieves an appropriate sequence of animation frames at a slower speed ranging from approximately eight frames to approximately 25 frames per second. Because of this limitation in displaying the animation sequence, in effect, the sampling devices are generally set at a common speed within the lower sampling speed range. In other words, since these sampling processes are performed in a predetermined sequence and each process must be complete before the next process, the slowest sampling process determines the common sampling speed and provides a certain level of machine independence.

Figure 4:
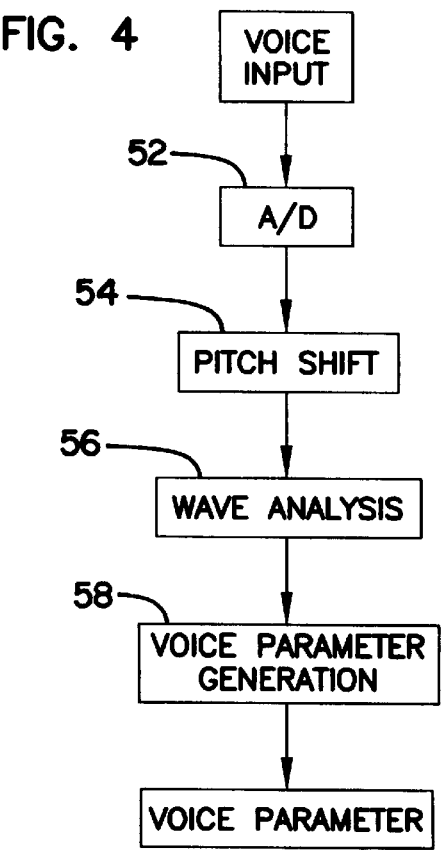
FIG. 4 diagrammatically illustrates processes performed by an input voice processing unit according to the current invention.

Now referring to FIG. 4, a flow chart describes general processes performed by the voice analyzing unit 12 of FIG. 3. The voice input is usually inputted in the animation system in an analog format via an analog device such as a microphone. The analog voice signal is converted into a digital format in an analog to digital conversion process in a step S2. The digitized voice signal is then preprocessed by a wave preprocess in a step S4. The preprocessed digitized voice input is analyzed in a wave analysis process in a step S6 to determine intermediate parameter values. Based upon the intermediate parameter values, a voice parameter generation process S8 generates voice parameter values. Some of the above-described general processes will be described in some detail.

The preprocess step S4 includes a process similar to a pitch shift as shown in FIGS. 5A–5D. Although the voice input is already in a digitized data, the process similar to the pitch shift is performed on the digitized data. In general, the pitch shift is performed to modify the pitch characteristic or frequency component of the voice input without modifying the duration of a sampling time. The pitch shift process compresses the voice input signal in the X axis by shifting by a predetermined amount. This increased frequency characteristics provides an improved voice signal to represent the changes in volume per a unit time. In particular, even though the original voice input has rapid changes in volume, the improved pitch shifted signal provides a smoother signal without jumping or bursts, yet responsive to the rapid changes. The increased frequency improves a response characteristics of the wave analysis step S6. In contrast, a merely shortened sample period generates an undesirable signal with bursts. The shortened sampling period does not necessarily respond to a fast raising input level. Furthermore, a response data from a short sampling period is also affected by phase changes in the original input data. As a result, the signal obtained by short sampling does not reflect the audio perception of the original input.

Figure 5:
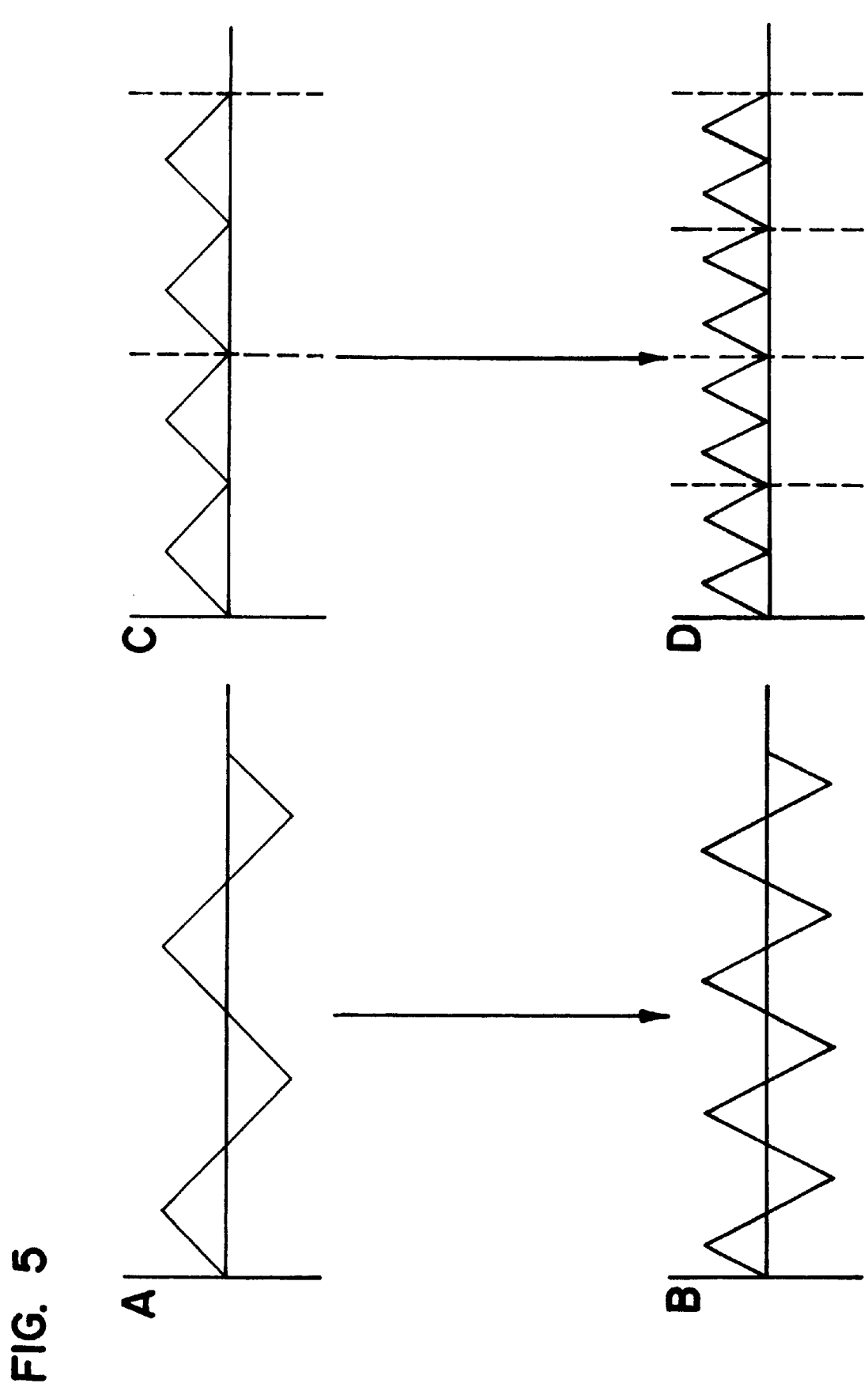
FIGS. 5A, 5B, 5C and 5D illustrate the basic concept of the pitch shift process.

Original input data as shown in a graph A of FIG. 5 is pitch-shifted to a graph B. The negative portion of the input data is flipped to be made positive as shown in graphs C and D. As a result of the above-described pitch shift process, the original input data is enhanced for certain response characteristics over a unit time. In this regard, Graphs C and D indicate that the response over a unit time is increased by two-fold or one octave. Because of the increased frequency response, input data from a short sampling period is not affected by the phase of the input data.

Figure 6A:
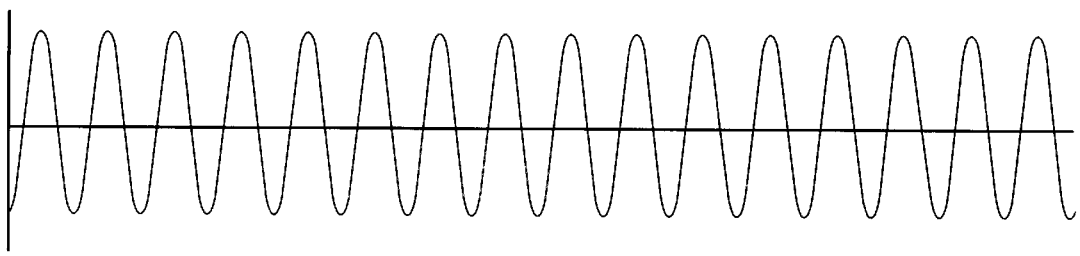
FIGS. 6A, 6B, 6C and 6D illustrate the result of combining the frequency shift waves according to the current invention.
Figure 6B:
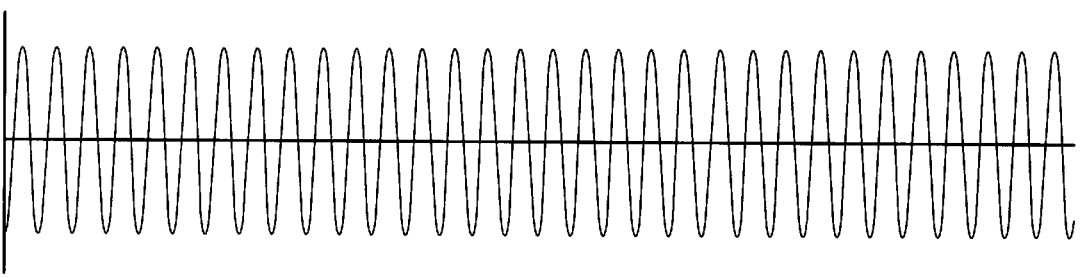
Figure 6C:
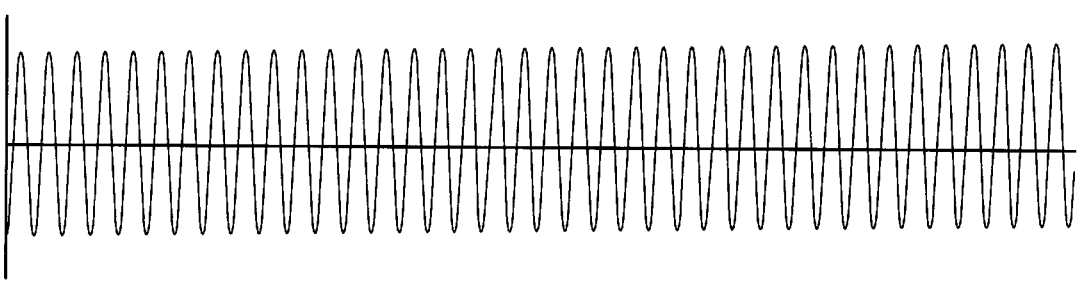

To effectively implement the pitch shift process, referring to FIGS. 6A through 6D, according to one preferred embodiment of the current invention, two pitch-shifted waves are generated from an original input data as shown in FIG. 6A so as to combine them to generate an optimal input signal. FIGS. 6B and 6C respectively show a first pitch-shifted wave signal B and a second wave signal C. For example, the second wave signal C is generated by further pitch-shifting the first wave signal B by one degree, and the first wave signal B is generated by pitch-shifting the original input by one octave.

Figure 6D:
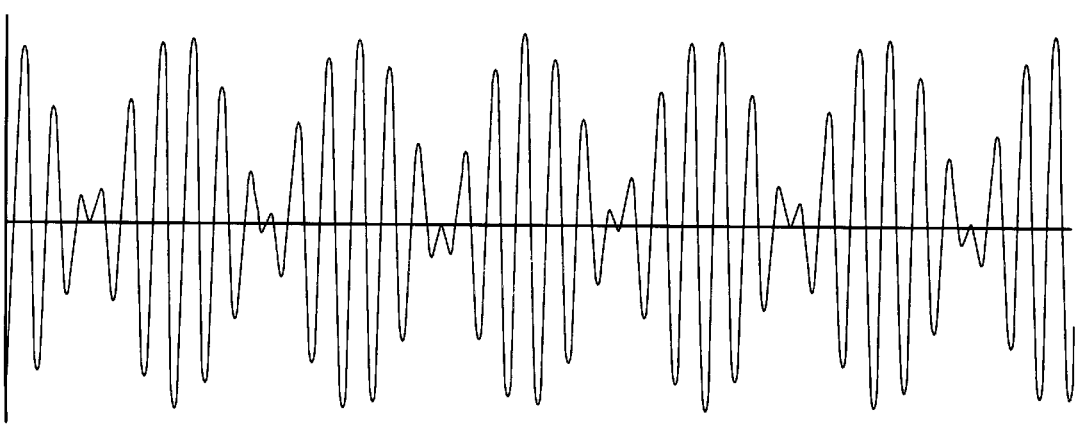

As shown in FIG. 6D, the two pitch-shifted wave signals B and C are combined into a single input signal D. The combined input signal D has a component that reflects the second wave signal C, and the component is generally considered as a small oscillation as a result of the addition and the subtraction of the two wave signals B and C. The oscillation is used to generate a natural swaying motion of the lips or other body movements during speech by the animated character in accordance with the frequency changes of the input voice.

Now referring to FIG. 7A, according to one preferred embodiment of the above-described pitch shift process, a digitally converted input voice signal is simultaneously pitch-shifted into two separate wave signals by Wave Processes A and B. The two pitch-shifted signals are combined into one wave signal by a wave merging process. The combined wave signal along with the original input signal is sent to a wave analysis process. The wave analysis process generates a predetermined set of parameters. Upon receiving the generated parameters, a voice parameter generation process generates a voice parameter.

Figure 7B:
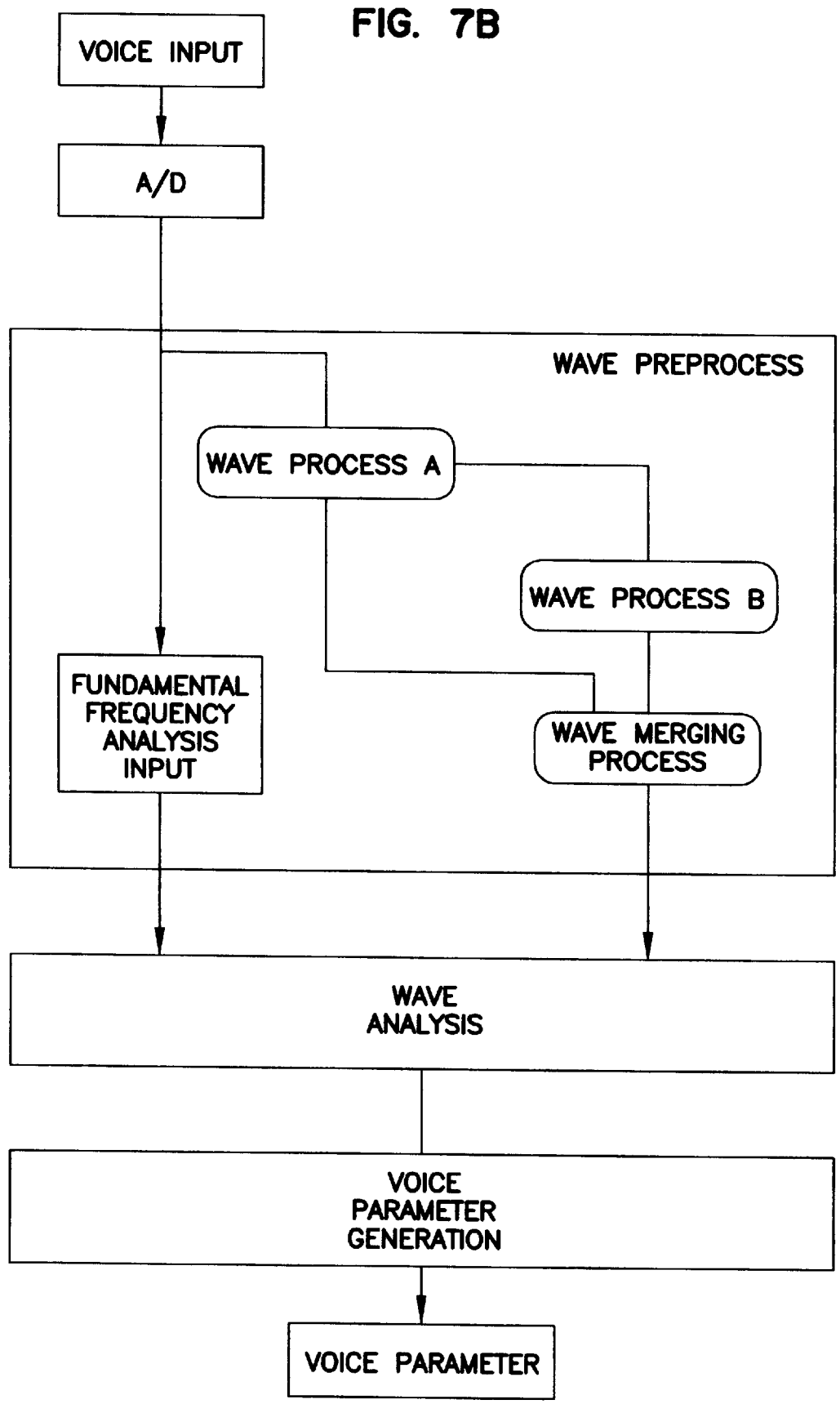

Now referring to FIG. 7B, an alternative embodiment of the above-described pitch shift process generates the two wave signals from the digitally converted input signal in the following manner. A second wave process B generates a second signal by further pitch-shifting a first wave signal which is already pitch-shifted once from an input voice signal by a first wave process. The first and second pitch-shifted signals are combined by the wave margin process. The rest of the processes in FIG. 7B are substantially similar to those of FIG. 7A.

Figure 8:
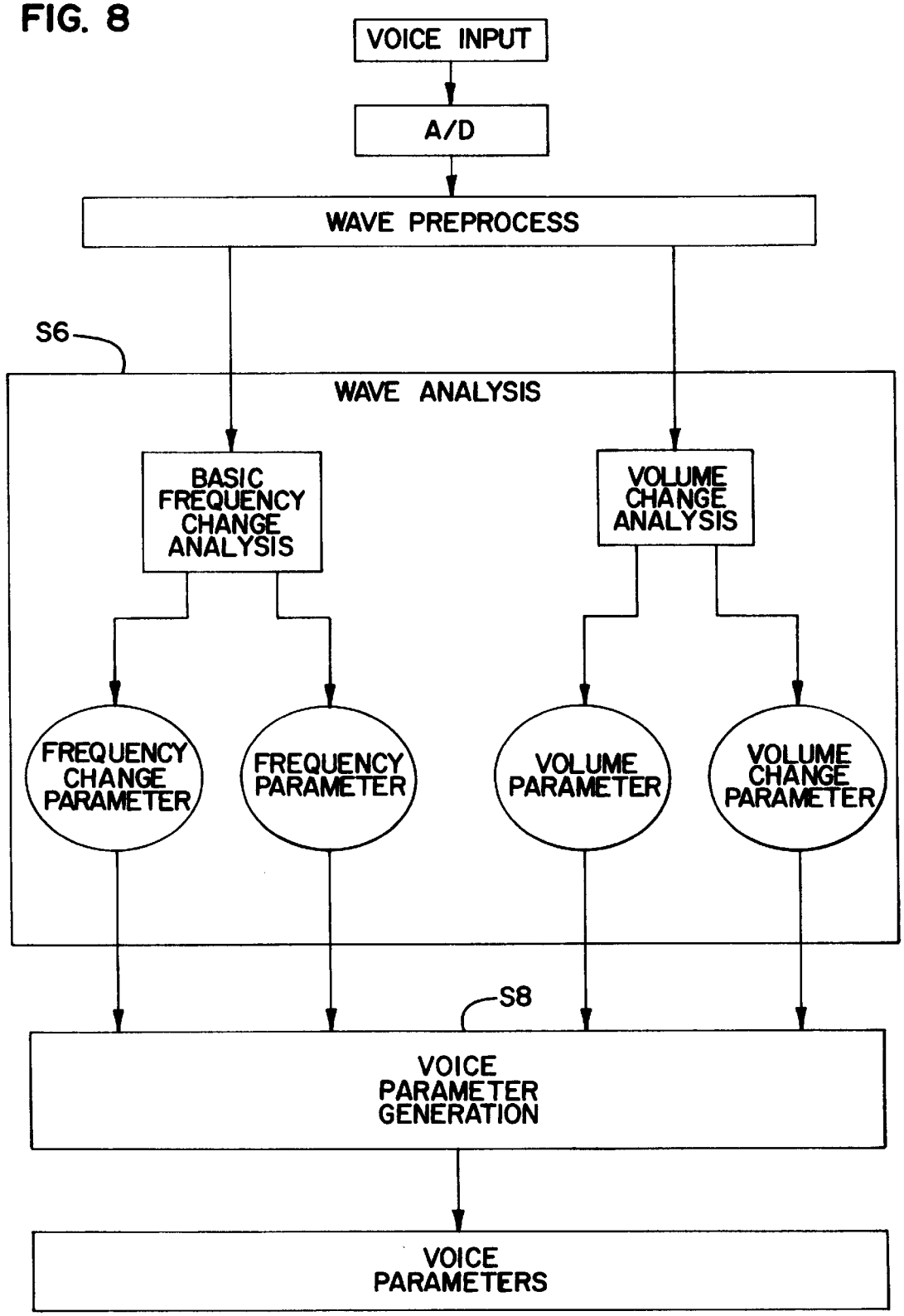
FIG. 8 diagrammatically illustrates some aspects of the wave analysis according to the current invention.

FIG. 8 illustrates some detail steps of the wave analysis process S6 as shown in FIGURE according to one preferred embodiment of the current invention. The wave analysis process S6 receives a basic frequency signal as well as a volume signal from the wave preprocess S4. In the wave analysis process, a basic frequency change analysis step generates a frequency change parameter and a frequency parameter based upon the basic frequency signal. In addition, a volume change analysis step generates a volume parameter as well as a volume change parameter based upon the volume signal. The parameters are sent to the voice parameter generation process S8 for generating voice parameters.

Figure 9:
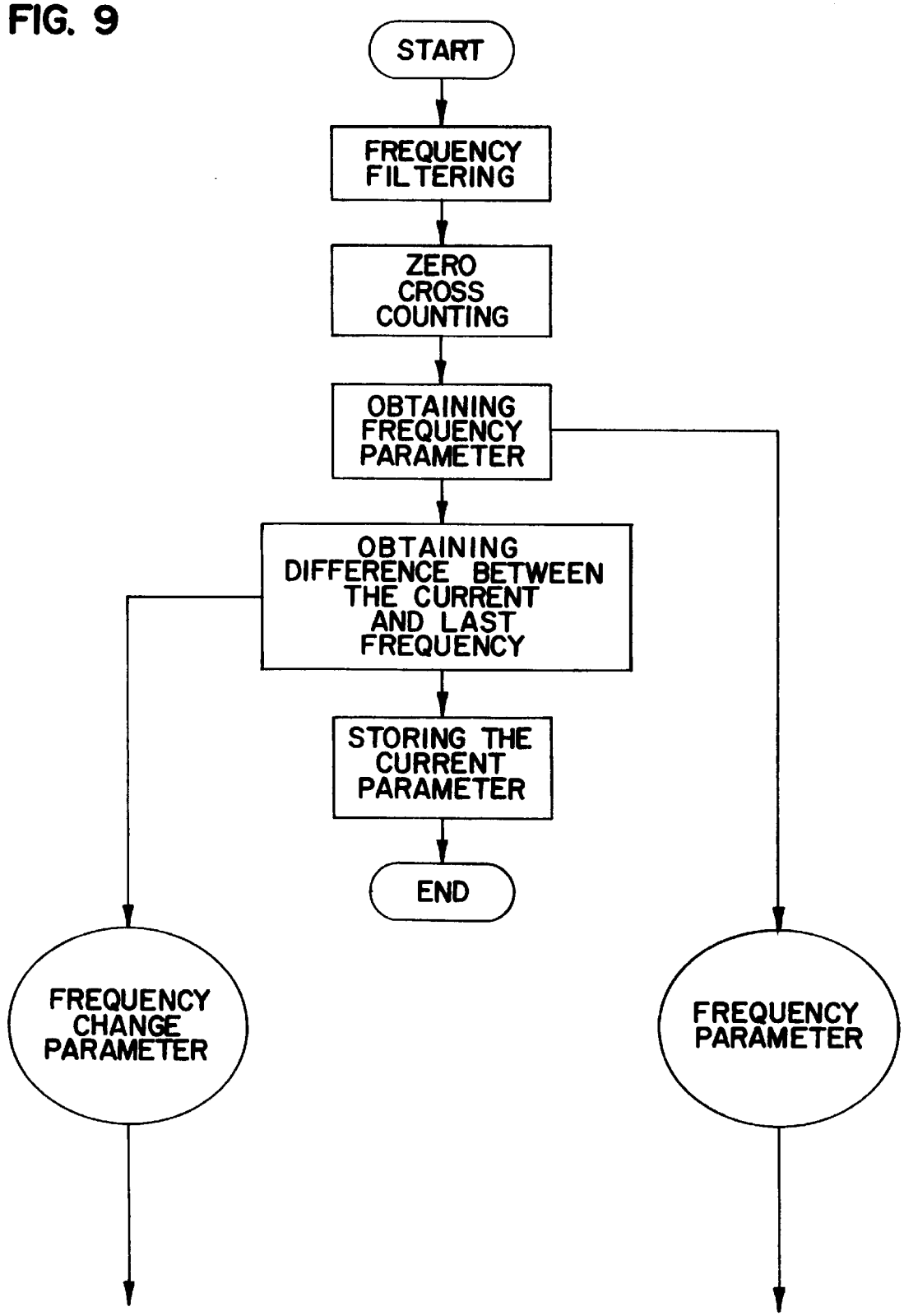
FIG. 9 further diagrammatically illustrates some aspects of a frequency analysis performed by the wave analysis unit according to the current invention.

Now referring to FIG. 9, according to one preferred embodiment of the current invention, some further detail steps of the basic frequency change analysis as shown in FIG. 8 are described in relation to the frequency change parameter and the frequency parameter. The basic frequency signal is filtered by a frequency filtering step using a low pass filter and a high pass filter so as to substantially eliminate undesired components of the input signal. For example, the undesired components include a portion of the signal corresponding to breath. In a zero crossing count step, the number of zero crossing by the input signal is counted over a predetermined time period in order to determine a basic average frequency. In general, this relatively simple calculation process allows the above frequency determination on a real-time basis. When the basic frequency of the input signal is determined, the basic frequency value is placed in a frequency parameter. In addition, the frequency value is compared to the last determined frequency value to determine a difference in frequency value between the current and the last input signal. The above difference value is placed in a frequency change parameter. Lastly, the last frequency value is updated by the current frequency value.

Figure 10:
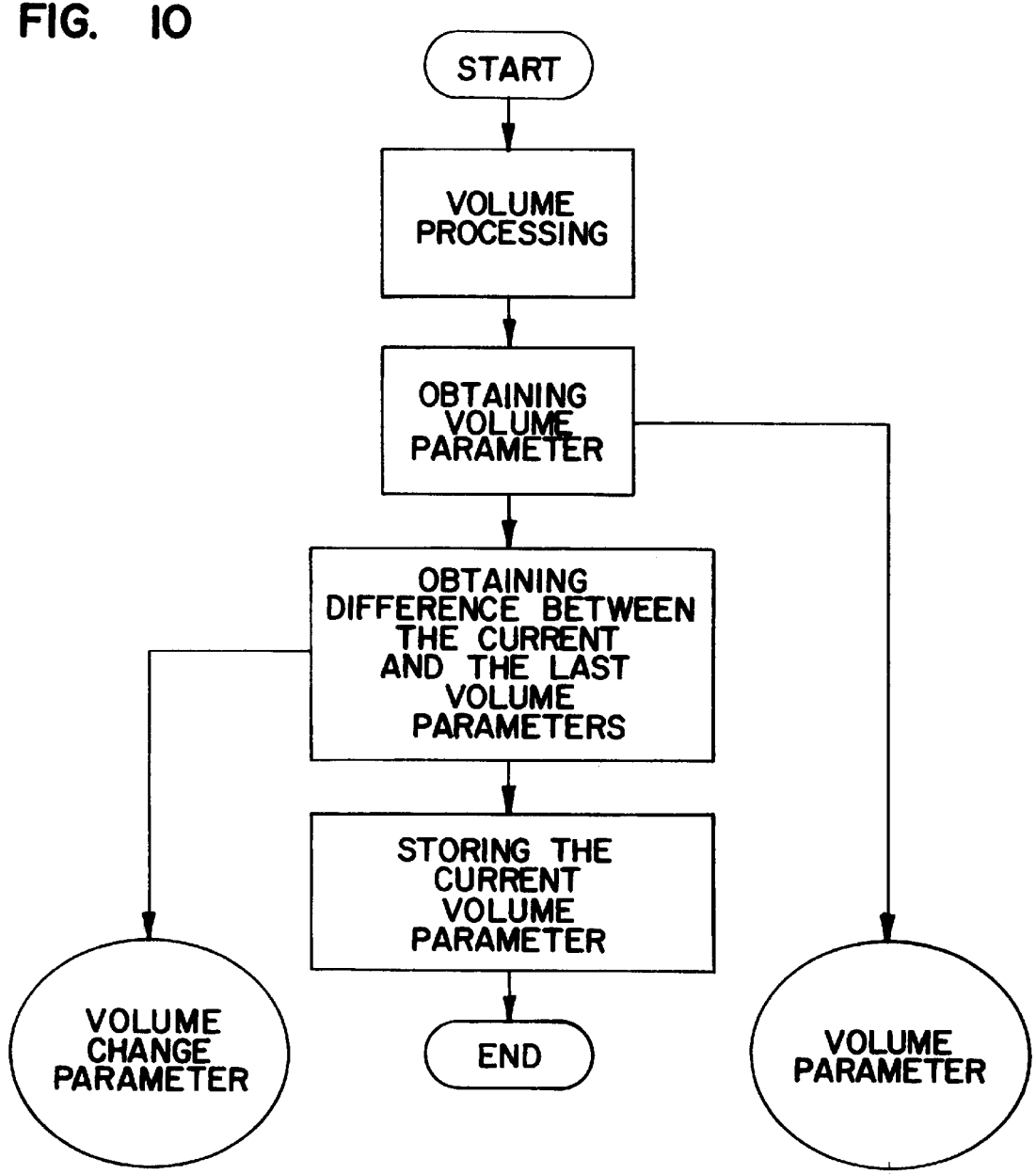
FIG. 10 further diagrammatically illustrates processes during a volume analysis performed by the wave analysis unit according to the current invention.

Referring to FIG. 10, the volume change analysis step of the wave analysis process S6 as shown in FIG. 8 is described in more detail. In a volume processing step, the volume signal is analyzed to determine a volume value based upon an average over a predetermined period of time. The volume value is placed in a volume parameter and is compared to a previous volume value to determine a difference in volume value between the current and the last volume signals. After the difference is determined, the difference value is placed in a volume change parameter, and the last volume parameter is updated by the current volume value.

Figure 11:
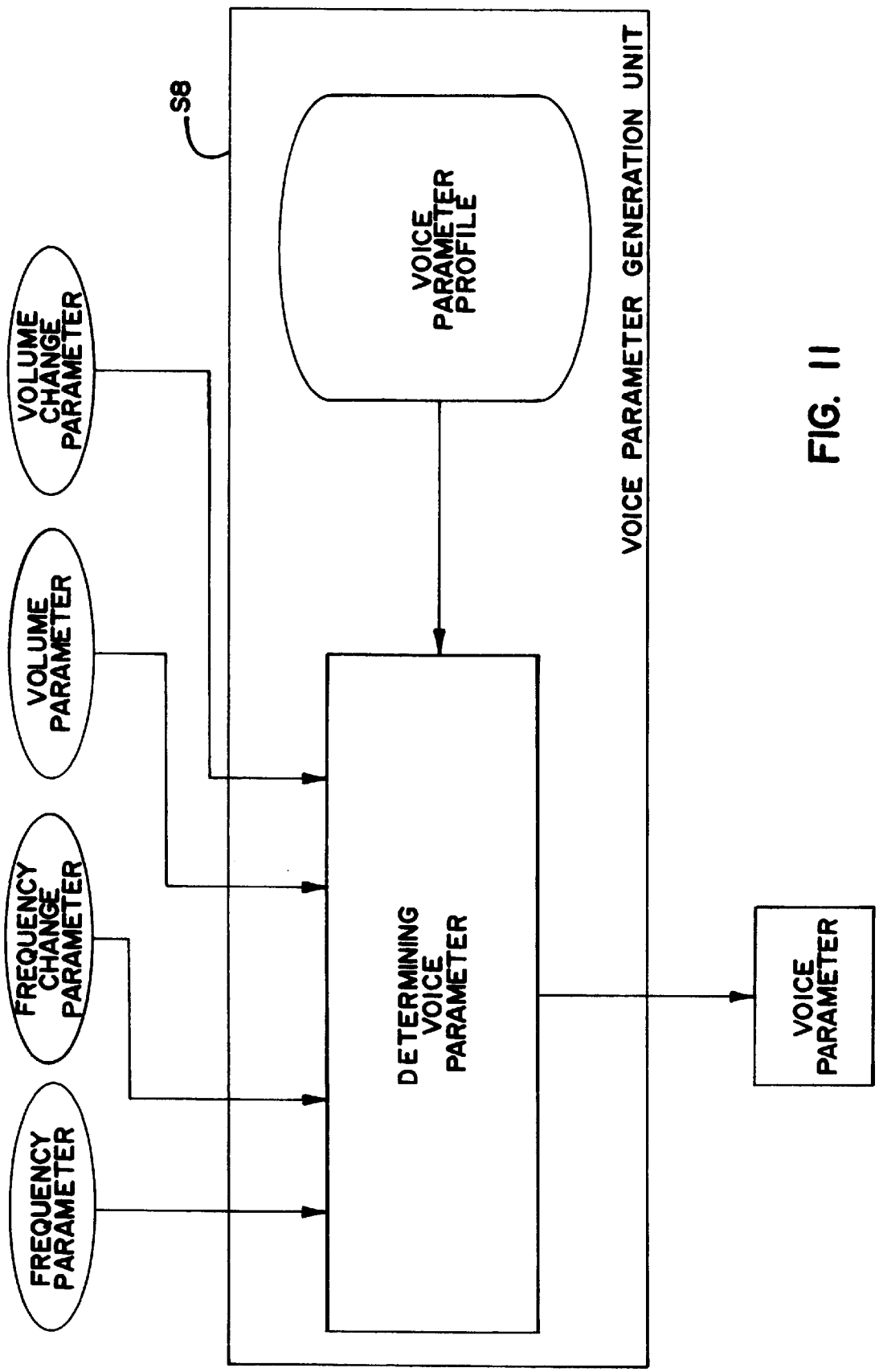
FIG. 11 diagrammatically illustrates voice parameter generation processes performed by a voice parameter generation unit based upon the output from the wave analysis unit according to the current invention.

Referring now to FIG. 11, the voice parameter generation process S8 of FIG. 8 includes further steps of adjusting the frequency parameter, the frequency change parameter, a volume parameter and a volume change parameter according to a volume parameter profile. The volume parameter profile contains specific sets of coefficients for adjusting the voice parameter values based upon a certain predetermined characteristics of the input voice signal, such as the gender of the voice.

Figure 12:
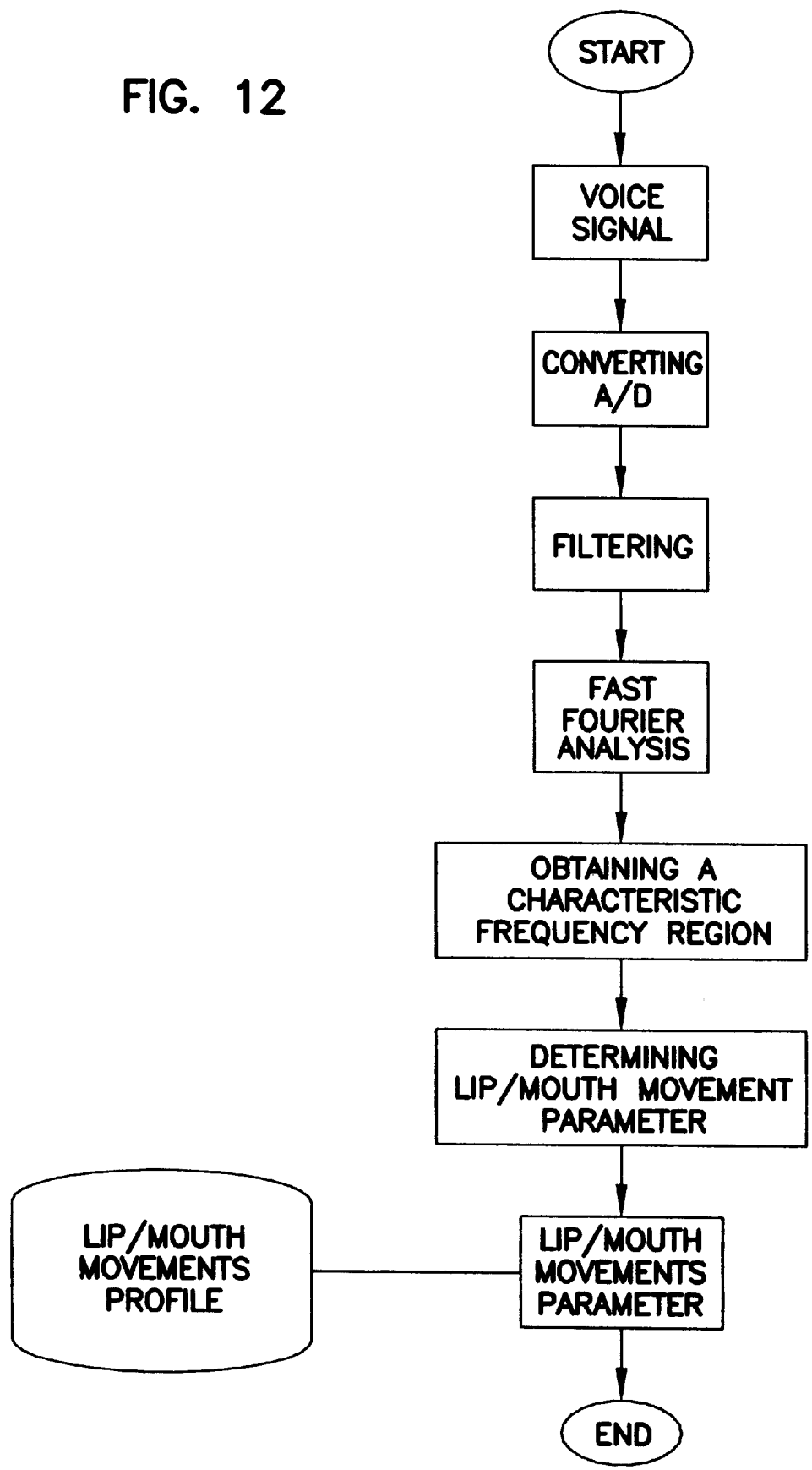
FIG. 12 illustrates a flow chart describing processes performed by an alternative embodiment for a voice input analyzing unit.

Referring to FIG. 12, according to an alternative embodiment of the current invention, digitally converted voice input data is filtered to substantially eliminate certain components of the data representing a frequency signal outside of human voice normally ranging from approximately 200 Hz to approximately 4000 Hz. The filtered input data is analyzed by a fast Fourier transformation step. As a result of the above analysis, the input voice signal now has a characteristic frequency region which indicates a common characteristic frequency for a particular sound regardless of individual voice characteristics. Based upon the above-described characteristic frequency region, an animation sequence for mouth and lip movements is selected from the lip pattern profile in the lip movement parameter determination step. The lip pattern profile may include other information such as coefficients for adjusting the selected lip parameters depending upon predetermined characteristics such as a gender of the input voice.

Figure 13:
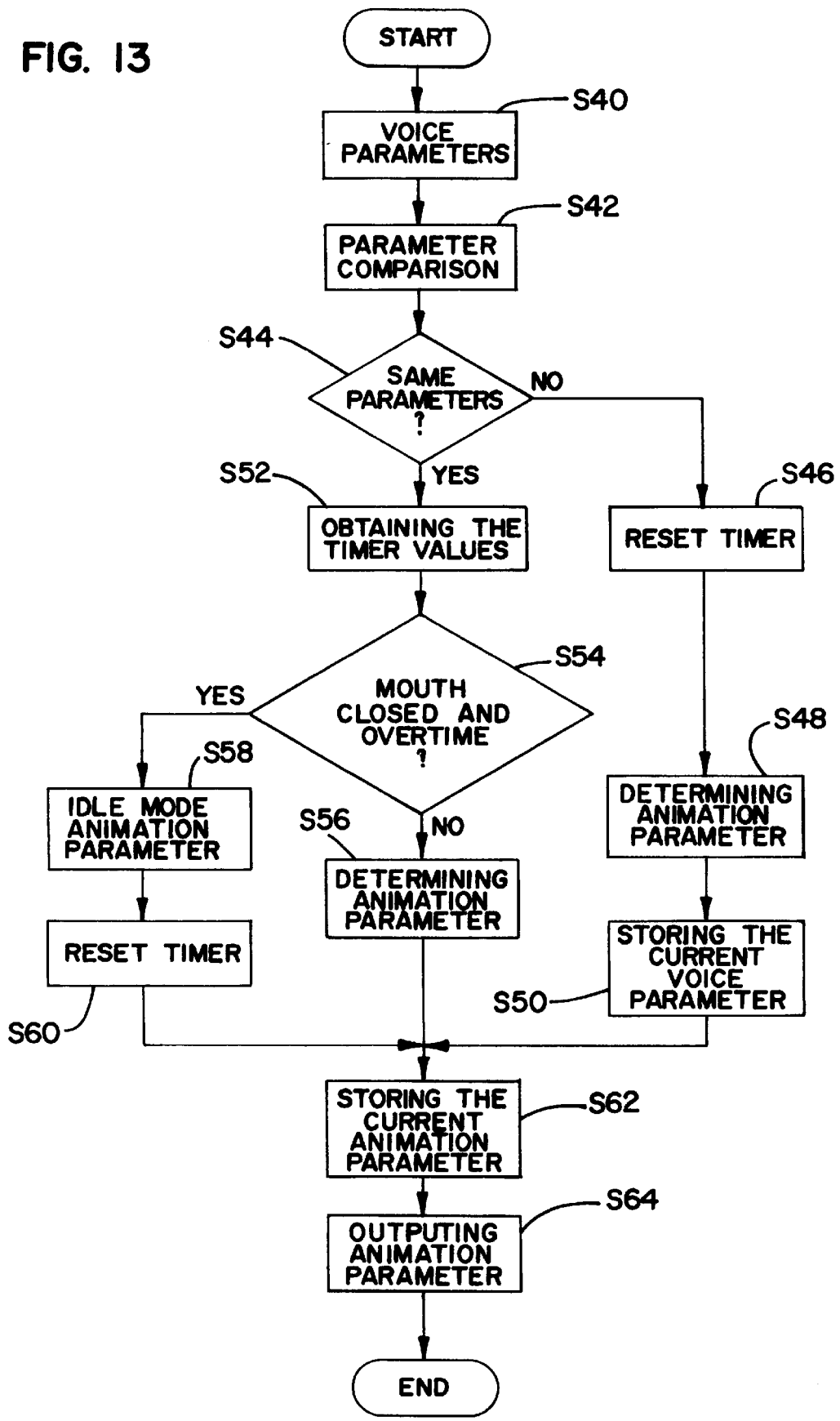
FIG. 13 is a flow chart describing processes performed after the voice parameter is generated so as to generate an animation parameter according to one preferred embodiment of the current invention.

Referring to FIG. 13, after the above-described voice parameter is generated, according to one preferred embodiment of the current invention, the system generally generates an animation sequence for animating a character according to the voice input from a step S40. To realistically animate the character, in steps S42 and S44, the currently generated voice parameter is compared to the last stored voice parameter so as to determine a context sensitive factor for the animation. In other words, for example, if the mouth is already open as indicated in the last voice parameter and the current voice parameter indicates no input voice. The next animation sequence frames should include the closing movements for the mouth.

Still referring to FIG. 13, when the step S44 determines that the current and last voice parameters are the same, the amount of the time in the same state is obtained from a timer in a step 44. As described later, the timer is reset to keep track of time in a particular state each time the current parameter indicates a new state. In a step S54, the current voice parameter is examined with respect to the mouth opening position and the above obtained timer value. In other words, it is determined whether or not the current voice parameter indicates a close mouth status and whether or not the timer value is larger than a predetermined value. If both of the two conditions are met, in a step 58, the animation parameter is determined based upon the above-described conditions. Under these conditions, the animation parameter generally indicates a predetermined idle mode. The idle mode will be fully described later with respect to the absence of the input voice. In the following step 60, the timer is reset. On the other hand, if both conditions are not met, in a step 56, the animation parameter is specified to reflect these failed conditions.

In the above step 44, when the current and the last voice parameters fail to match, an animation sequence is determined to reflect a change in the character representation. In a step S46, the timer is reset so that an amount of time in the new state is monitored. In a step S48, based upon the current voice parameter, a new animation parameter is determined. In a step 48, the current voice parameter is stored since the current voice parameter is different from the last. In any event, the new or current animation parameter is stored for the next comparison in a step S62.

The current animation parameter generally specifies an animation sequence of the animation frames for animating the character in accordance with the voice parameter. In a step 64, the new animation parameter is outputted to an animation generating/rendering system.

Figure 14:
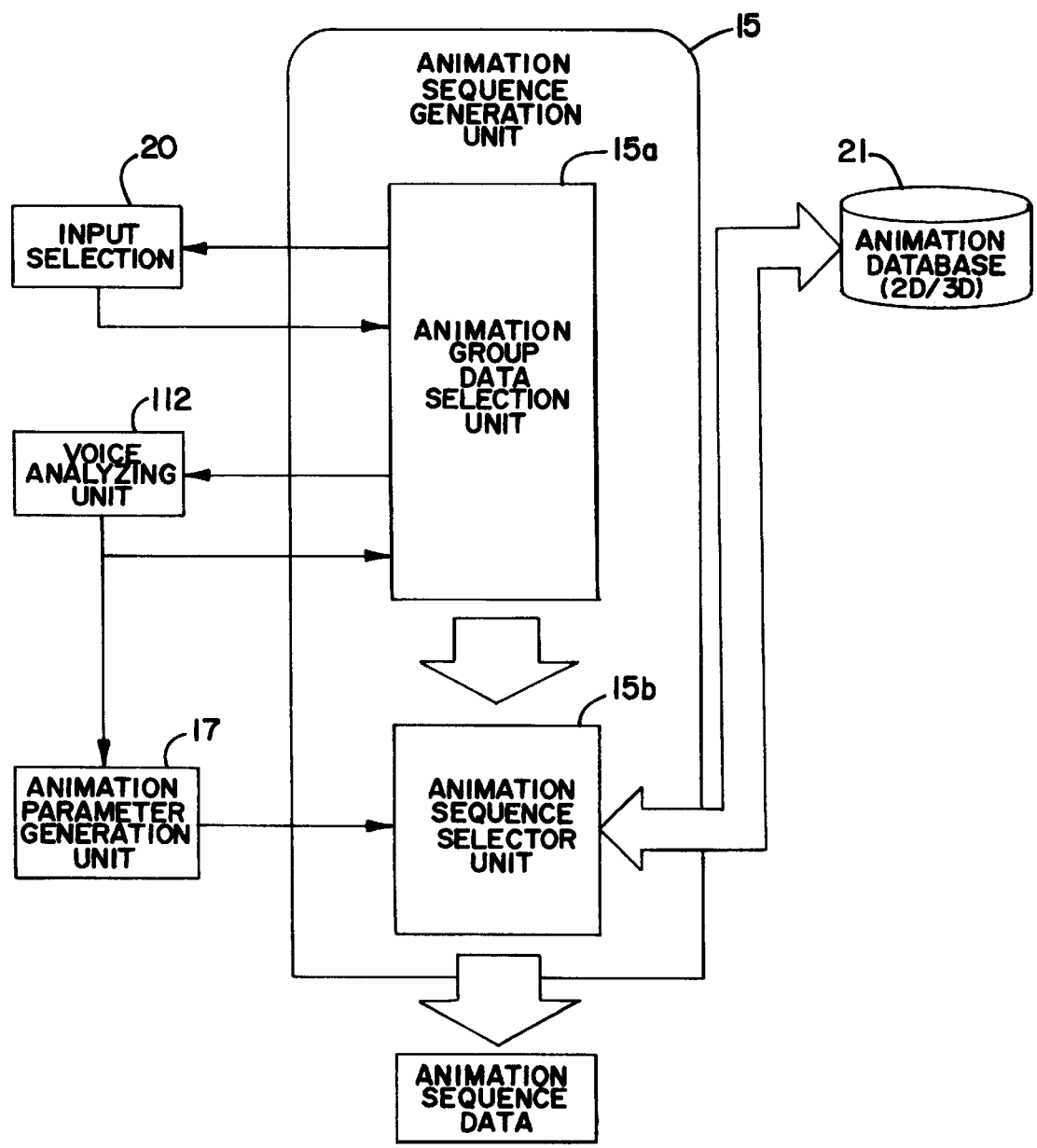
FIG. 14 is a simplified block system diagram of one preferred embodiment for generating animation sequence data from an animation database based upon an input voice and a selected input according to the current invention.

Referring to FIG. 14, one preferred embodiment of an animation generator according to the current invention is diagrammatically illustrated. An animation sequence generator unit 15 is an engine for generating a desired animation sequence based upon inputs. The inputs include the above-described animation parameter from an animation parameter generation unit 17, the above-described voice parameter from a voice analyzing unit 12 and an auxiliary input from an input selection unit 20. According to one preferred embodiment of the current invention, the input selection unit 20 includes any input device such as a foot switch, a control pad and a key board and provides additional selections. For example, a performer of the character selects one or a combination of state(s) of mind from a predetermined set of expressions such as happiness, anger, surprise and so on as the performer provides a voice input. In addition to the above example, the auxiliary input also includes any other inputs such as limb positions of the performer sensed by position sensing devices. According to the preferred embodiment, the animation sequence generator 15 either polls or triggers the above-described input proving units so as to coordinate the input signals to the animation sequence generator 15. However, according to an alternative embodiment, these input devices send respective input in parallel to the animation sequence generator unit 15.

Still referring to FIG. 14, based upon the above-described inputs, the animation sequence generator 15 generates animation sequence data. The animation sequence generator 15 includes an animation sequence selector unit 15b and an animation group data selection unit 15A, which receives the above-described auxiliary input as well as voice parameter. The animation group data selection unit 15A sends its output to the animation sequence selector unit 15b which also receives the above-described animation parameter from the animation parameter generation unit 12. The animation sequence selector unit 15b selects a desired sequence of animation frames from an animation database 21 based upon the received inputs. The animation database 21 contains a predetermined set of animation frames for a specified character. Although one preferred embodiment of the animation database 21 according to the current invention contains two-dimensional animation frames, the animation database in an alternative embodiment contains animation data for rendering three-dimensional images for animating the character.

Figure 15:
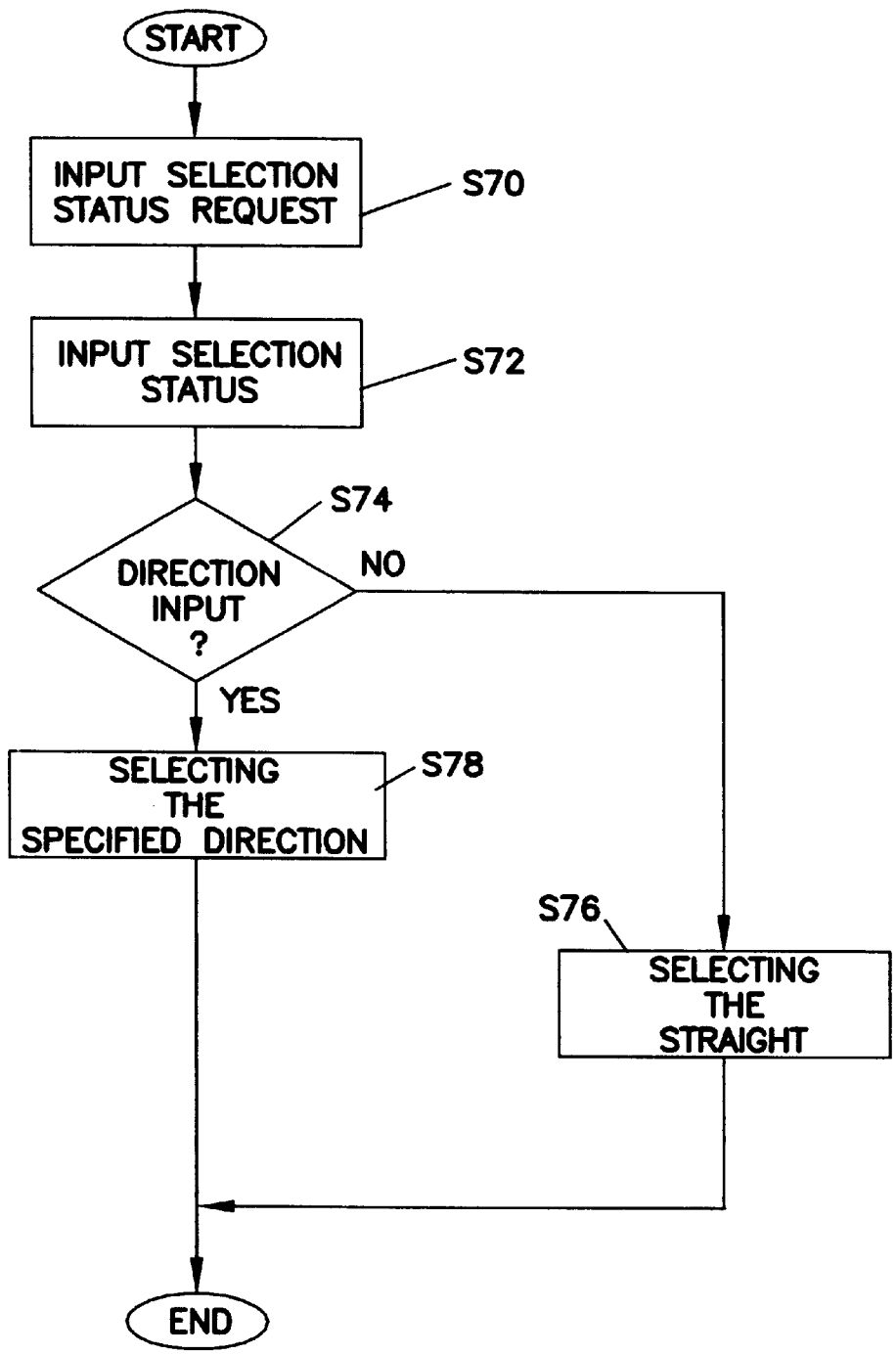
FIG. 15 is a flow chart describing processes for determining an orientation of the face of a character based upon an input from an input selector according to the current invention.

Now referring to FIG. 15, one aspect of a preferred process of selecting animation frames is illustrated in a general flow chart. The selection process starts with a step S70 of requesting a status of the above-described input selector 20 as shown in FIG. 14. In a step 72, auxiliary input data is obtained from the input selector unit 20. In this example, in a step S74, the auxiliary input data is examined to determine whether the direction of the character with respect to a display device is specified by an performer. For example, the directions include right, left center, up and down. When the above information is specified, in a step S78, the direction is selected according to the selected input. On the other hand, if the performer does not specify the direction, the direction is assumed to be center facing straight to the display as a default direction in a step 76.

Figure 16:
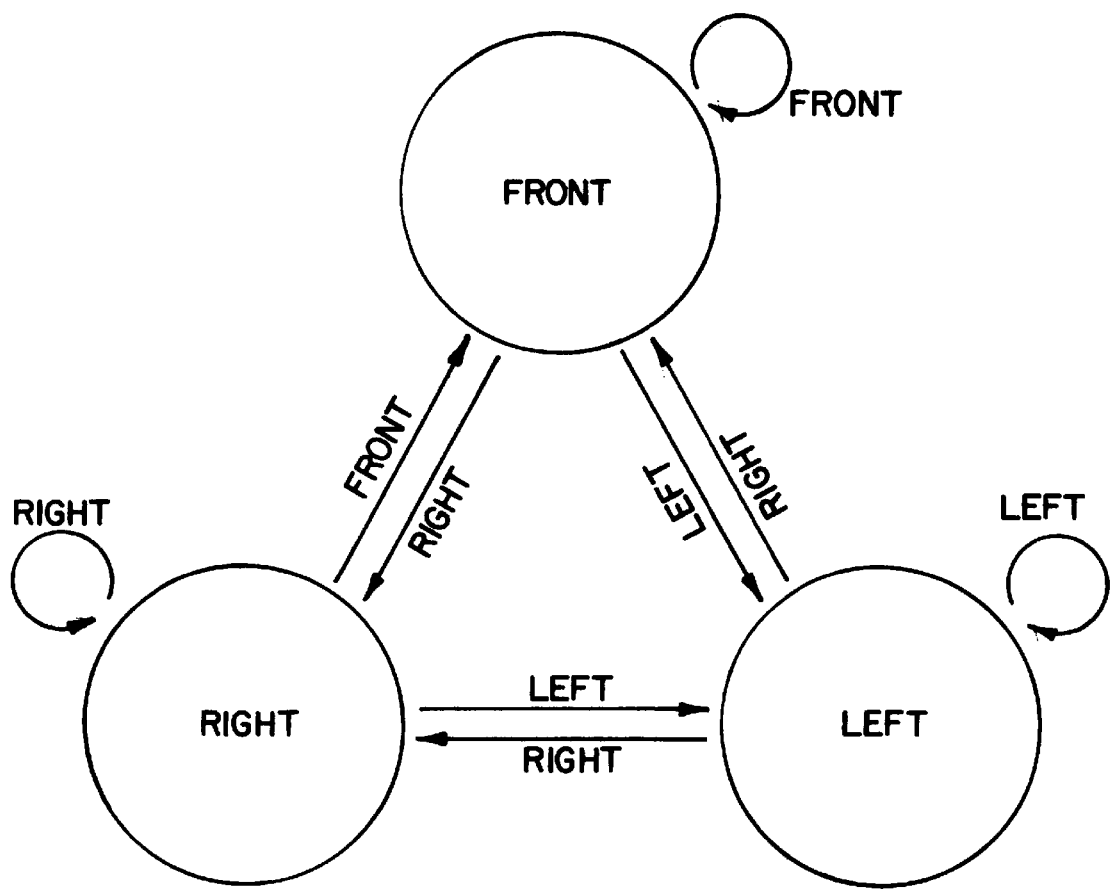
FIG. 16 is a state machine for the character facial orientation according to the current invention.

Referring to FIG. 16, the above-described orientation selection process is illustrated in a state machine based upon the above-described example. In this example, the facial orientation is selected from one of the three predetermined orientations including front, right and left as denoted by three circles. Regardless of an initial orientation of the character, a performer specifies the next facial orientation via an input selector unit as the performer speaks to provide a voice input. For example, if the current facial orientation is to the right and the next orientation signal indicates the front orientation, the current facial orientation is updated to the front. On the other hand, if the current facial orientation is to the right and the next facial orientation signal indicates to the right, the current facial orientation is maintained as indicated by a self-referencing arrow. As described above, the state machine for the facial orientation allows flexible transitions between any two predetermined orientations.

Figure 17:
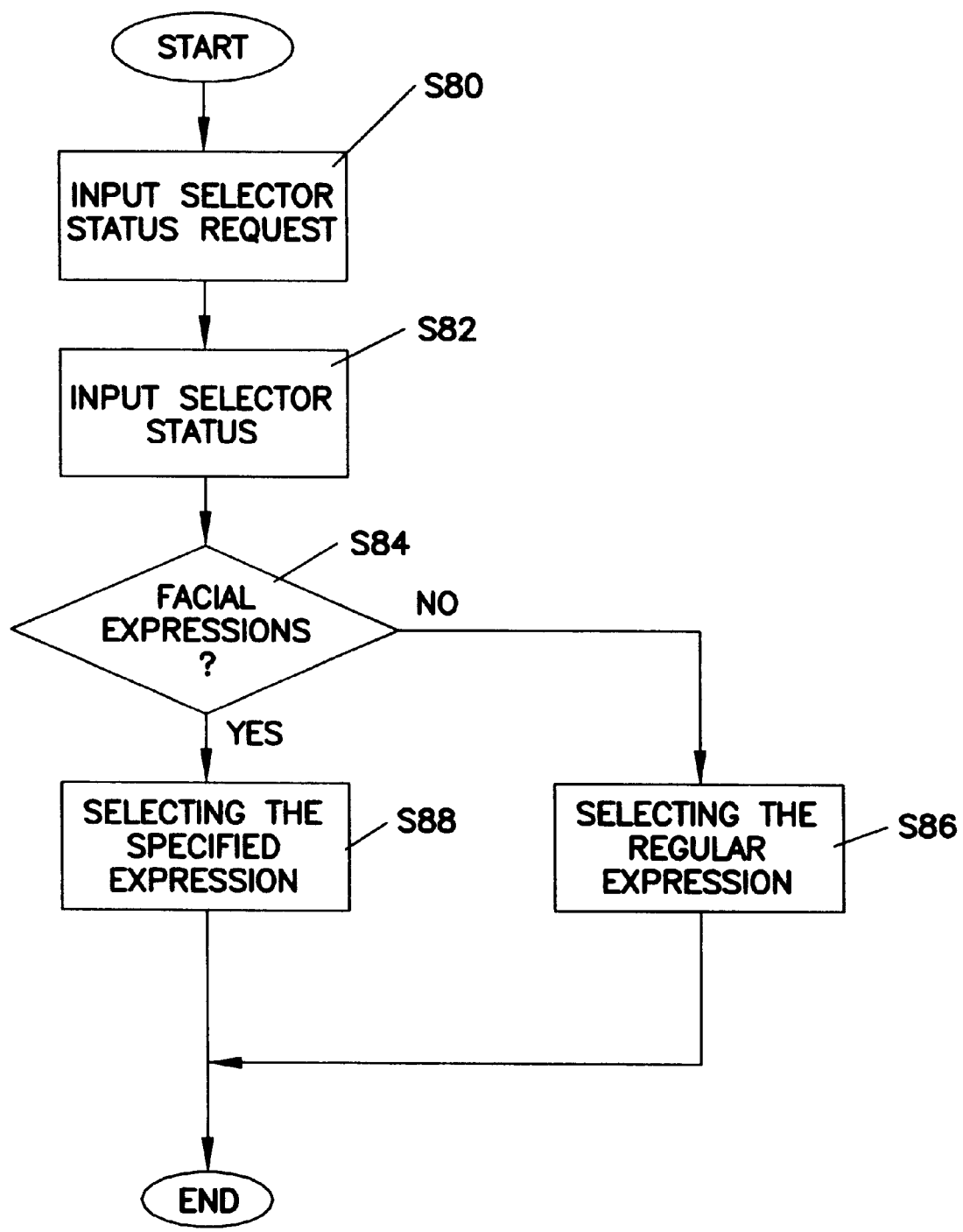
FIG. 17 is a flow chart describing processes for determining an expression of a character based upon an input from an input selector according to the current invention.

Now referring to FIG. 17, another aspect of a preferred process of selecting animation frames is illustrated in a second general flow chart. The selection process starts with a step S80 of requesting a status of the above-described input selector 20 as shown in FIG. 14. In a step 82, auxiliary input data is obtained from the input selector unit 20. In this example, in a step S84, the auxiliary input data is examined to determine whether any facial expression of the character is specified by an performer. For example, the facial expressions include anger, happiness, surprise, sadness and no expression. When the above information is specified, in a step S88, appropriate animation frames corresponding to the specified expression are selected according to the selected input. On the other hand, if the performer does not specify any expression, the expression is assumed to be neutral or normal face as a default expression in a step 86.

Figure 18:
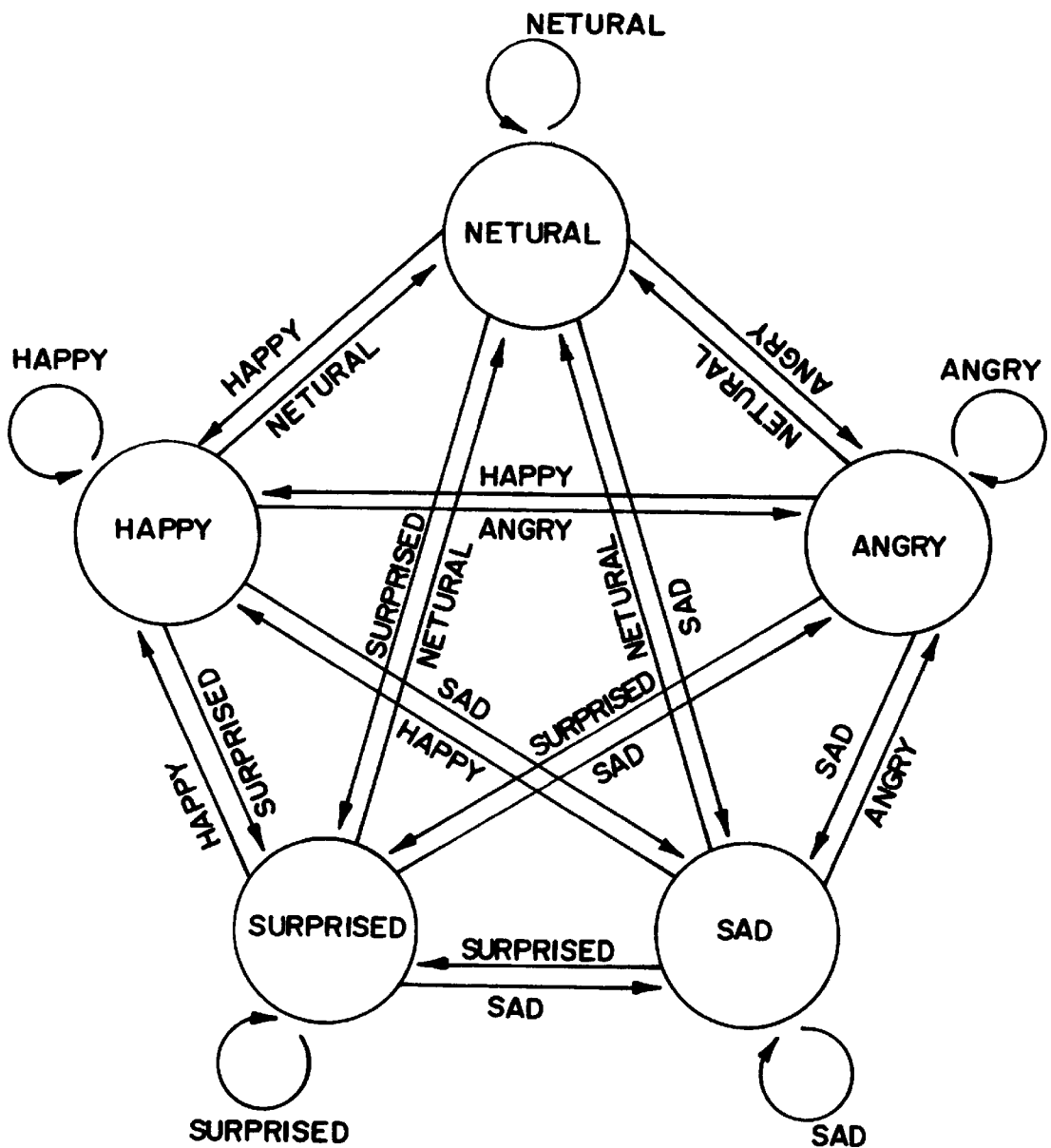
FIG. 18 is a state machine for the character expression according to the current invention.

Referring to FIG. 18, the above-described facial expression selection process is illustrated in a state machine based upon the above-described example. In this example, the facial expression is selected from one of the five predetermined expressions including neutral, anger, sadness, surprise and happiness as denoted by five circles. Regardless of an initial expression of the character, a performer specifies the next facial expression via an input selector unit as the performer speaks to provide a voice input. For example, if the current facial expression is surprise and the next orientation signal indicates neutral, the current facial expression is updated to neutral. On the other hand, if the current facial expression is to surprise and the next facial orientation signal also indicates surprise, the current facial expression is maintained as indicated by a self-referencing arrow. As described above, the state machine for the facial expression allows flexible transitions between any two predetermined expressions.

Figure 19:
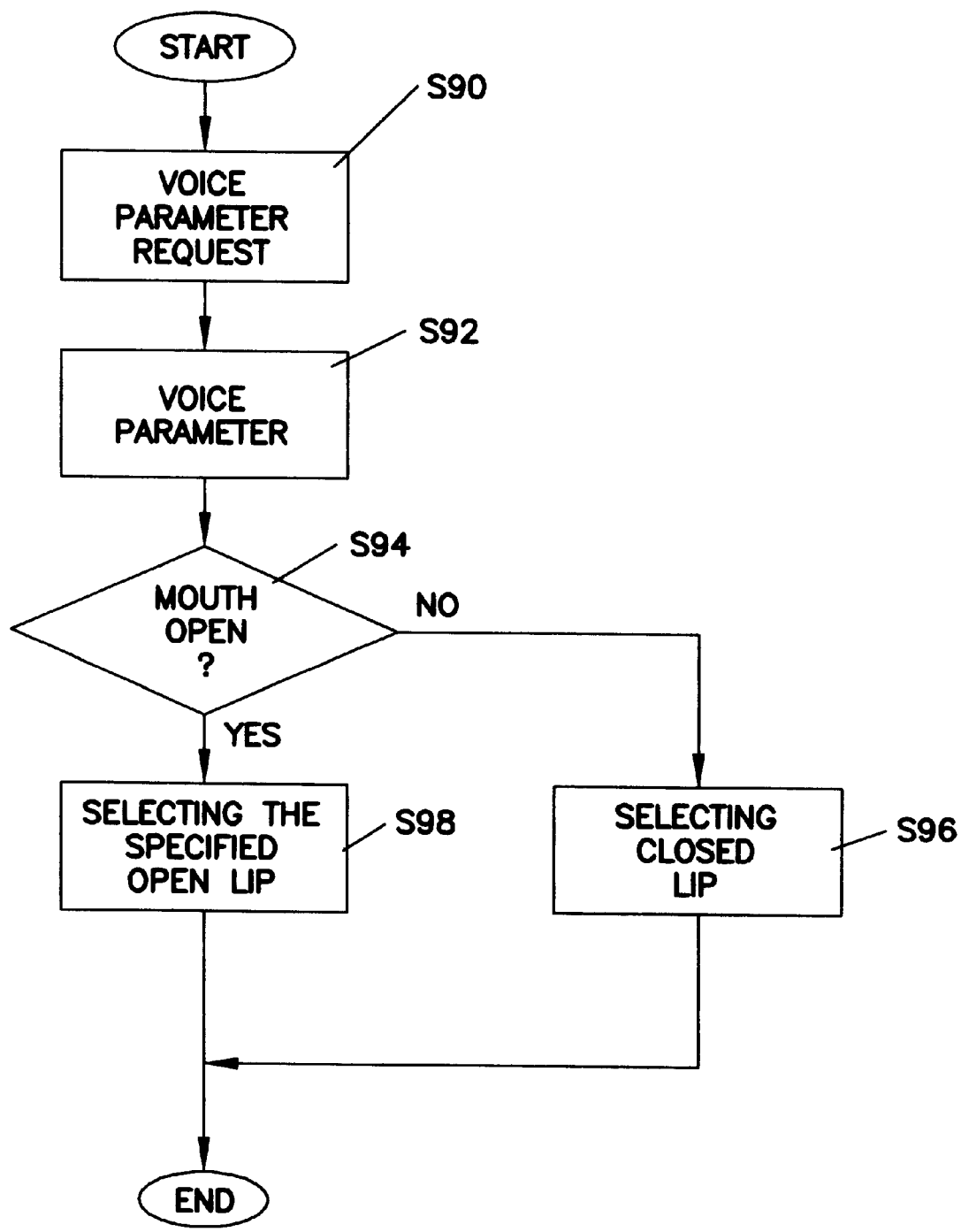
FIG. 19 is a flow chart describing processes for determining a mouth position of a character based upon a voice input according to the current invention.

Now referring to FIG. 19, yet another aspect of a preferred process of selecting animation frames is illustrated in a third general flow chart. The selection process starts with a step S90 of requesting a voice parameter. In a step 92, the voice parameter is obtained and in a step S94, the voice parameter is examined to determine whether the mouth or lip is to be opened or closed. When the voice parameter indicates that the mouth to be opened, in a step S98, appropriate animation frames corresponding to the specified mouth opening movements are selected according to the voice parameter. For the sake of simplicity, according to this and the following examples, the lip or mouth is to be opened in three degrees as slight, moderate and wide. On the other hand, if the voice parameter does not specify any mouth/lip opening move, the mouth/lip is assumed to be closed as a default position in a step 96.

Figure 20:
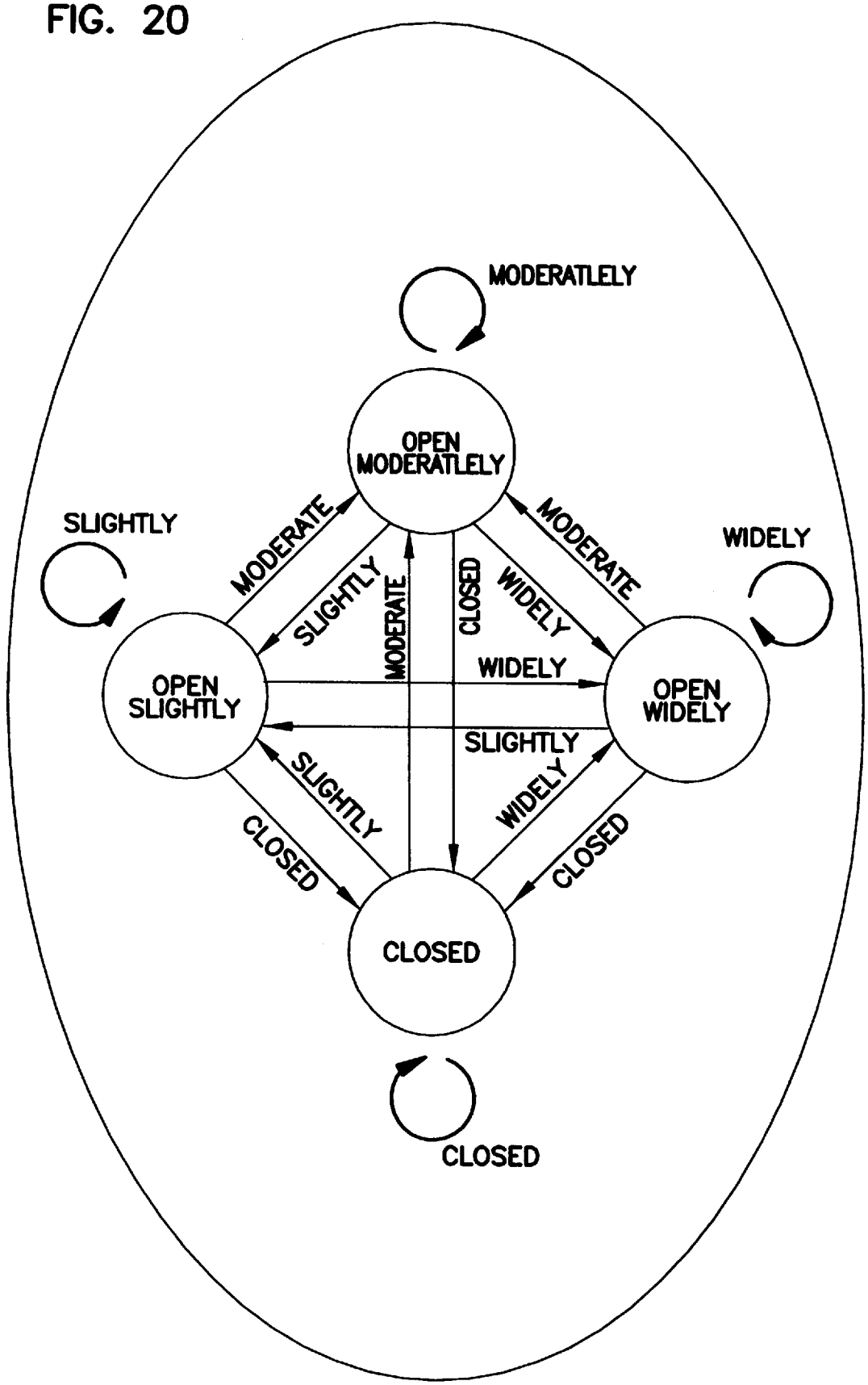
FIG. 20 is a state machine for the mouth position according to the current invention.

Referring to FIG. 20, the above-described mouth/lip selection process is illustrated in a state machine based upon the above-described example. In this example, the mouth/lip opening is selected from one of the three predetermined degrees of mouth/lip opening including slight opening, moderate opening and wide opening as well as one closed state as denoted by four circles. Regardless of an initial mouth/lip state of the character, a performer's voice automatically specifies the next mouth/lip state as the performer speaks. For example, if the current mouth/lip state is slightly open and the next voice parameter indicates wide open, the current mouth/lip state is updated to wide opening. On the other hand, if the current mouth/lip state is moderate open and the next voice parameter also indicates moderate open, the current mouth/lip state is maintained as indicated by a self-referencing arrow. As described above, the state machine for the mouth/lip animation allows flexible transitions between any two predetermined opening/closing positions.

Figure 21:
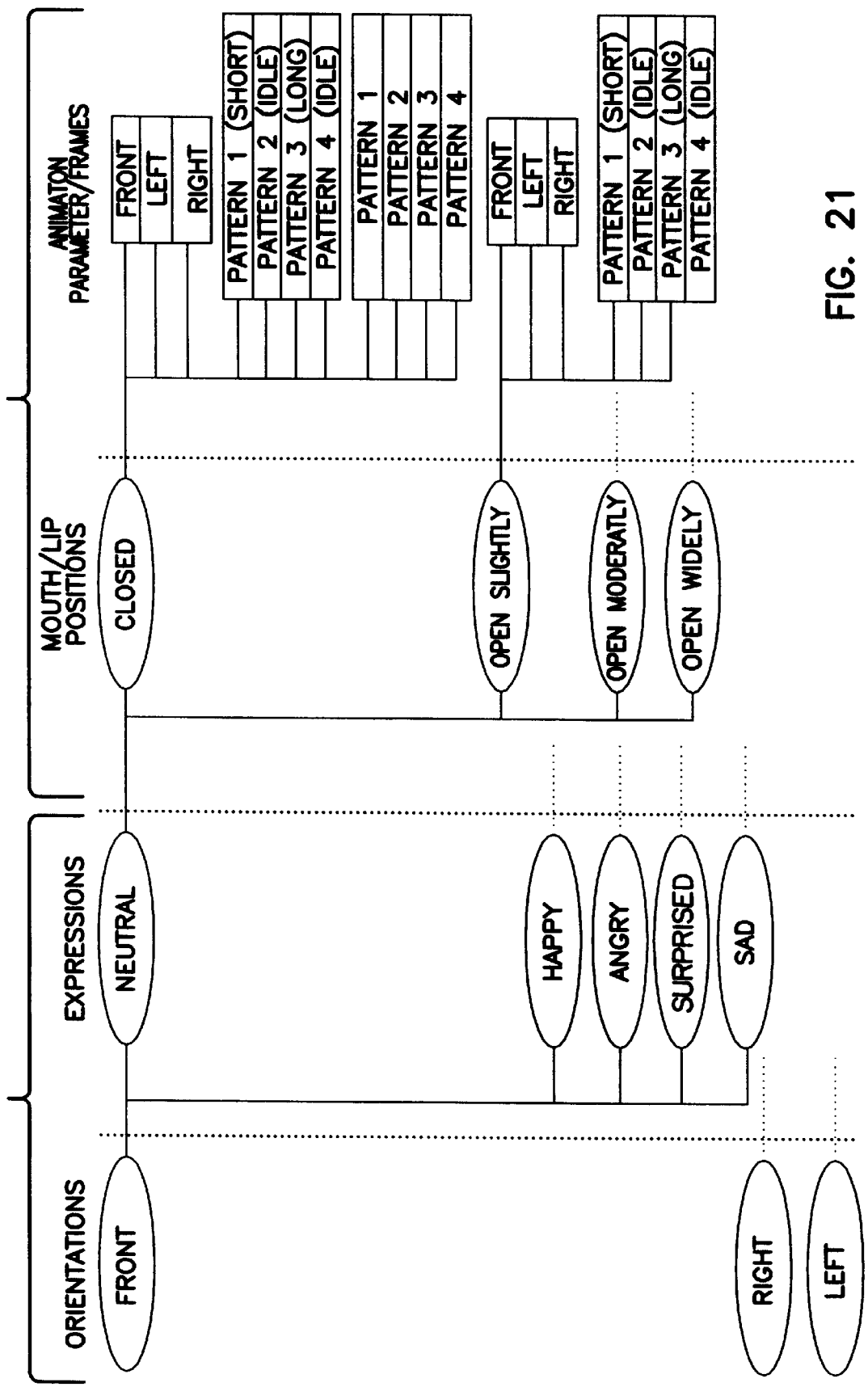
FIG. 21 diagrammatically illustrates how animation parameters or animation frames are organized in relation to the facial orientations, the expressions and the mouth positions according to one preferred embodiment of the current invention.

Now referring to FIG. 21, the above-described aspects of the selection process according to the current invention require predetermined sets of animation frames for generating an animation sequence for the selected combined aspects of the character. In order to accommodate the combinations of the above-described orientations, expressions and mouth/lip positions, at least 3×5×4 combinations of the animation sequence are necessary. FIG. 21 further illustrates additional aspects of the character animations including a head tilt such as right, left and no tilt as well as short and long idle movement patterns. The idle movements will be later described with reference to FIG. 22. These additional aspects or movements further increase the number of predetermined animation frames to be stored in an animation database.

Despite the large memory storage requirement, the animation generation from the predetermined animation frames is an efficient as well as economical way to provide a real-time system. Based upon the animation parameter, a specified animation frames are selected for animation generation. For example, a performer softly speaks, but did not select any facial orientation or expression. Based upon the above input, a corresponding animation parameter is generated, and according to the generated animation parameter, an animation frame representing that a character faces front with a neutral facial expression with a slightly open mouth is selected from the animation database. Subsequently, the selected animation frame is outputted to a display for animating the character.

The animation generation according to the current invention is not limited to the a predetermined animation frames of the character representation. An alternative embodiment of an animation database according to the current invention includes information related to three-dimensional rendering of an animated character. One example of the three-dimensional information is coordinates of the face of a character for faster graphics. Similarly, the coordinates of certain parts of the face such as eyes, ears may be also stored in this embodiment.

According to yet another embodiment of an animation database includes additional information on a background where a character is animated. The background information includes a scenery or an environment where the character is located during the animation. For example, the character is in a house for providing a house tour. Another example is that the character is in an imaginary environment which does not exist in a real world. The background information may be either separate from the character information or combined with the character information.

Figure 22:
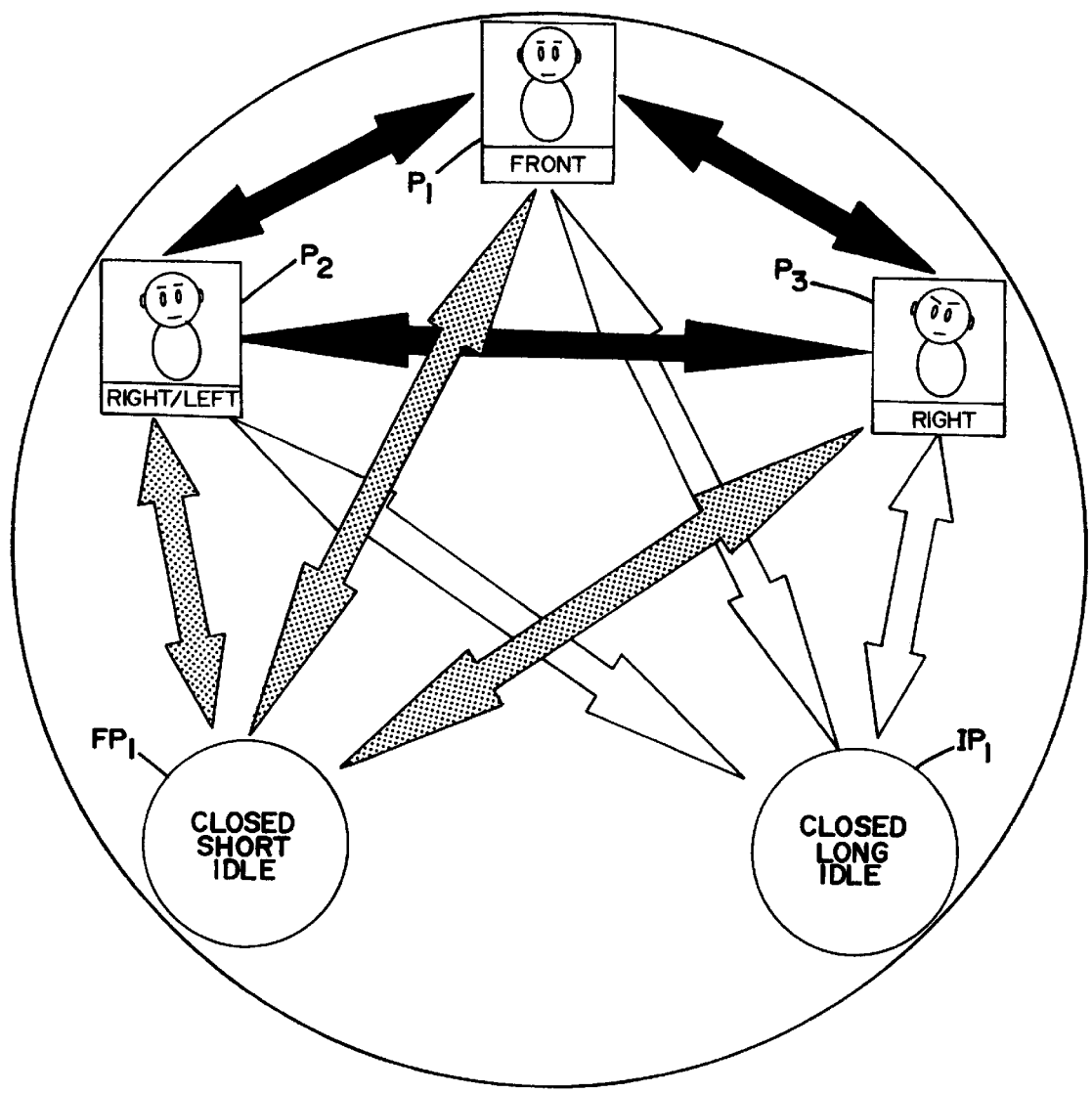
FIG. 22 is a state machine for handling situations when the closed mouth inputs are repeated over a time according to one preferred embodiment of the current invention.

Now referring to FIG. 22, according to one preferred embodiment of the current invention, idle movements are generated when the substantially same inputs are repeated. One example of such a repetition is shown in FIG. 22 when a performer does not speak or does not specify any auxiliary input except for a head tilt for a predetermined amount of time. Accordingly, the character as illustrated in P1, P2 and P3 each has a closed mouth representation. P1 faces front while P2 and P3 respectively tilt their head to the left and the right. Among these head tilted positions, the characters may be animated to tilt its head as indicated by black arrows. On the other hand, when there is no input for a first or short predetermined amount of time, the character is animated according to a short closed mouth idle pattern FP1. Stippled arrows indicate the transition to the short closed mouth idle pattern FP1. Furthermore, when there is no input for a second predetermined amount of time which is longer than the first predetermined amount of time, the character is animated according to a long closed mouth idle pattern IP1. Solid arrows indicate the transition to the long closed mouth idle pattern. The above-mentioned idle patterns are described in relation to FIGS. 23 and 24.

Figure 23:
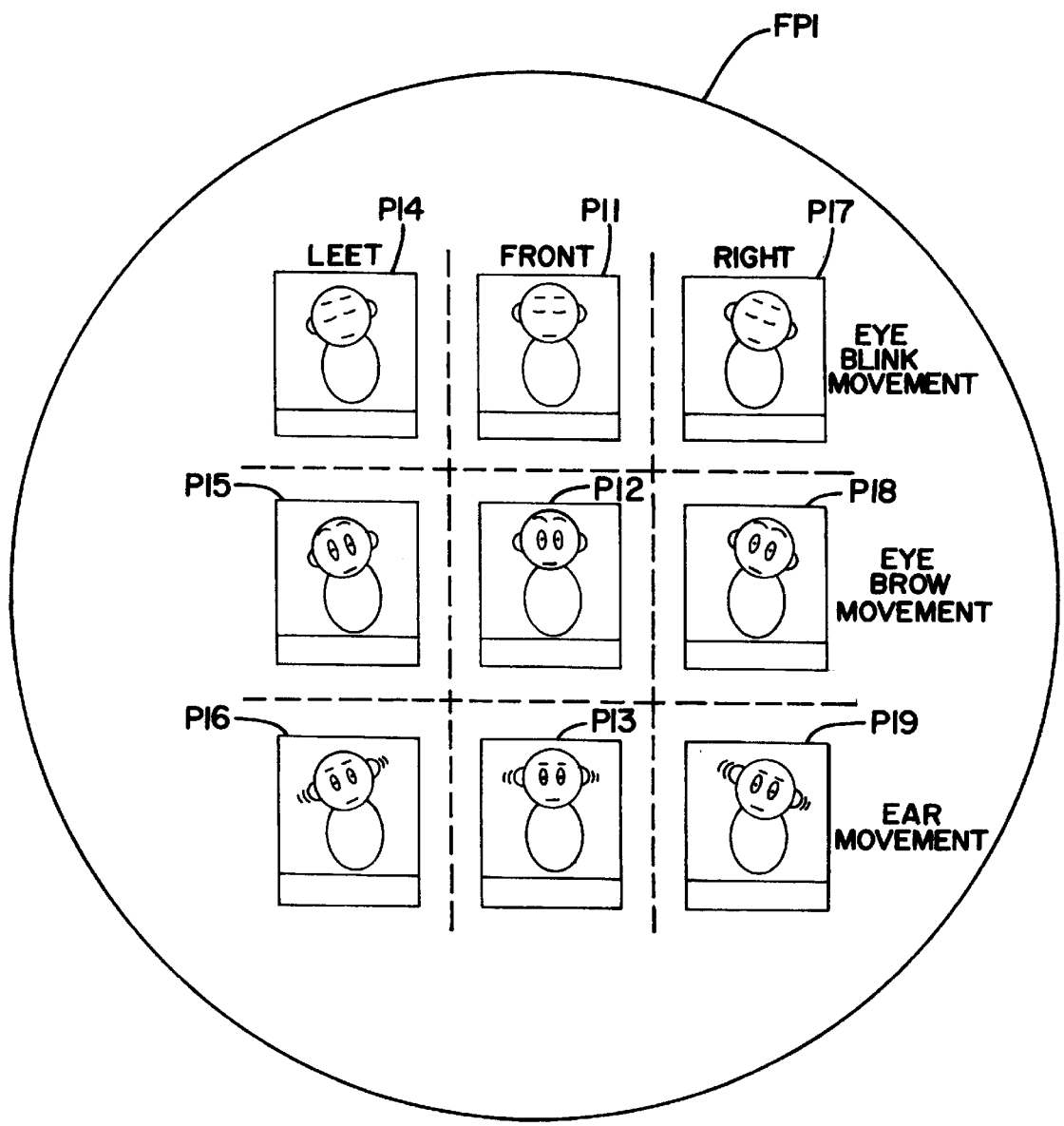
FIG. 23 illustrates example animation frames for the closed mouth inputs are repeated for a short predetermined time.

Referring to FIG. 23, examples of the above-mentioned short closed mouth idle patterns are illustrated according to one preferred embodiment of the current invention. When there is no voice input for a short predetermined time such as a few seconds, according to one example of the short closed mouth idle pattern, a character's head is tilted in a predetermined way so as to approximate natural movements. According to this example, the head is tilted from the center in a counter clockwise direction and then in a clockwise direction. These movements prevent the character from appearing lifeless during the absence of speech or any other selected animations.

Still referring to FIG. 23, when there is no input for a first or short predetermined amount of time, the character is animated according to a short closed mouth idle pattern. The first row including frames P14, P11 and P17 represents the above-described head tilt movement while the eyes are closed. The second row including frames P15, P12 and P18 shows the natural head tilt movement while the eyes are open and the eyebrows are raised. The third row including frames P16, P13 and P19 illustrates the same head tilt movement with open eyes along with some additional ear movements. At least, one of these short closed mouth idle patterns is selected depending upon the current character representation when the predetermined amount of time elapses without a voice input.

Figure 24:
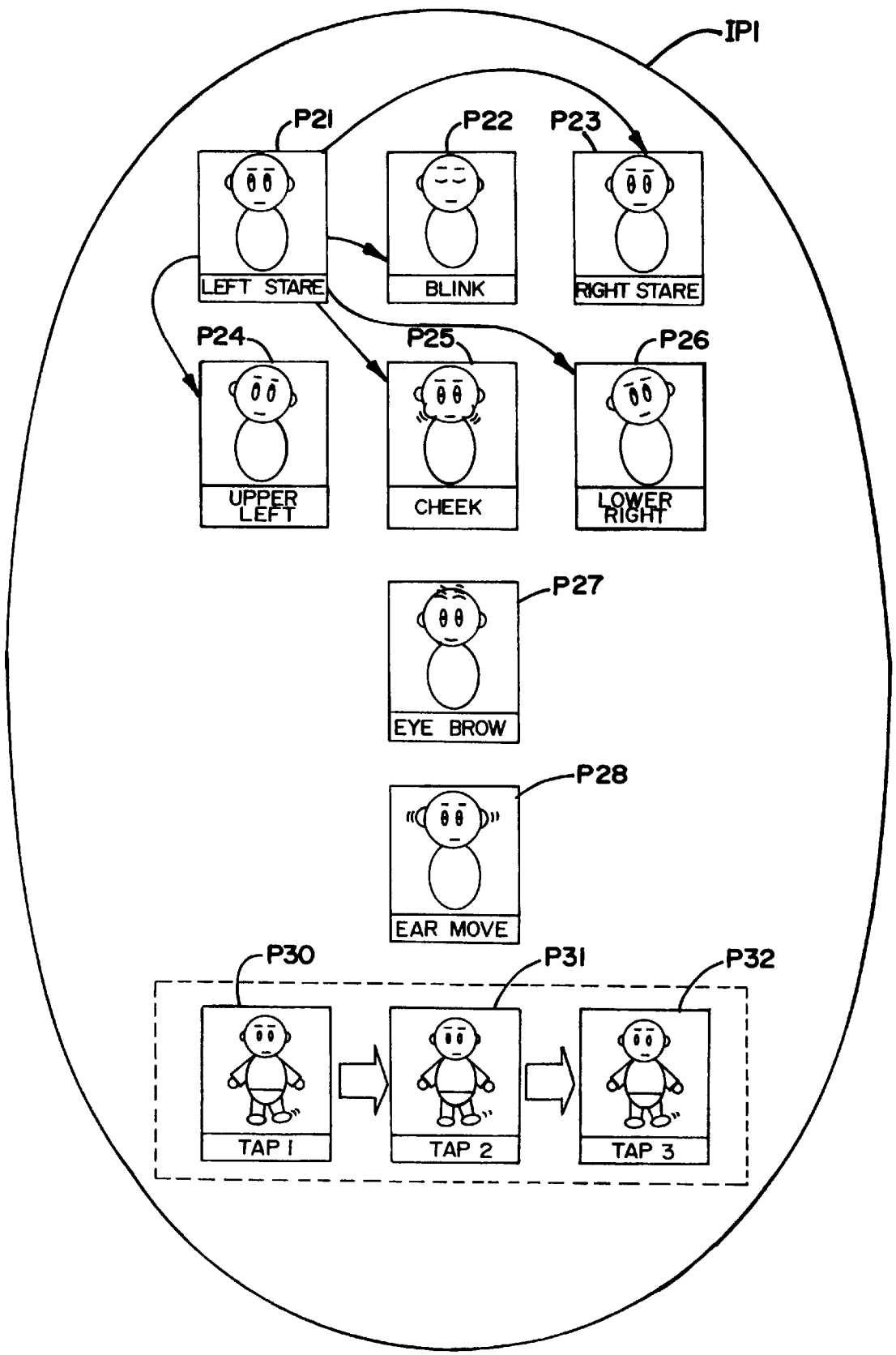
FIG. 24 illustrates example animation frames for the closed mouth inputs are repeated for a long predetermined time.

Now referring to FIG. 24, similarly, examples of the above-mentioned long closed mouth idle patterns are illustrated according to one preferred embodiment of the current invention. When there is no voice input for a long predetermined time such as several seconds, according to one example of the long closed mouth idle pattern, a character's head is tilted in the above-described way so as to approximate natural movements. In addition, under certain circumstances, some cheek movements and certain body movements such as foot tapping are also included in the long closed mouth idle pattern. These movements prevent the character from appearing lifeless during the absence of speech or any other selected animations.

Still referring to FIG. 24, one example of the long closed mouth idle movements include the first row including frames P21, P22, P23 for eye movements along with an eye blink, the second row including frames P24, P25 and P26 for head tilt movements with a cheek movement. In addition, the foot tapping frames P30, P31 and P32, an eyebrow moving frame P27 and an ear moving frame P28 are also included in the long closed mouth idle movements. As indicated by arrows pointing from the frame P21 to other frames, the long closed mouth idle movements have a larger number of variations and often randomized. In addition, the frequency occurrence of each of the selected movements is also varied or randomized to further increase the natural appearance of the character during the absence of speech.

According to another preferred embodiment of the current invention, the above-described short as well as long closed mouth idle patterns are randomized to further increase the natural appearance of the character. According to an alternative embodiment, these idle movements are customized for each character to exaggerate certain characteristics of each character. For such customization, a character profile is stored in the above-described animation database.

Figure 25:
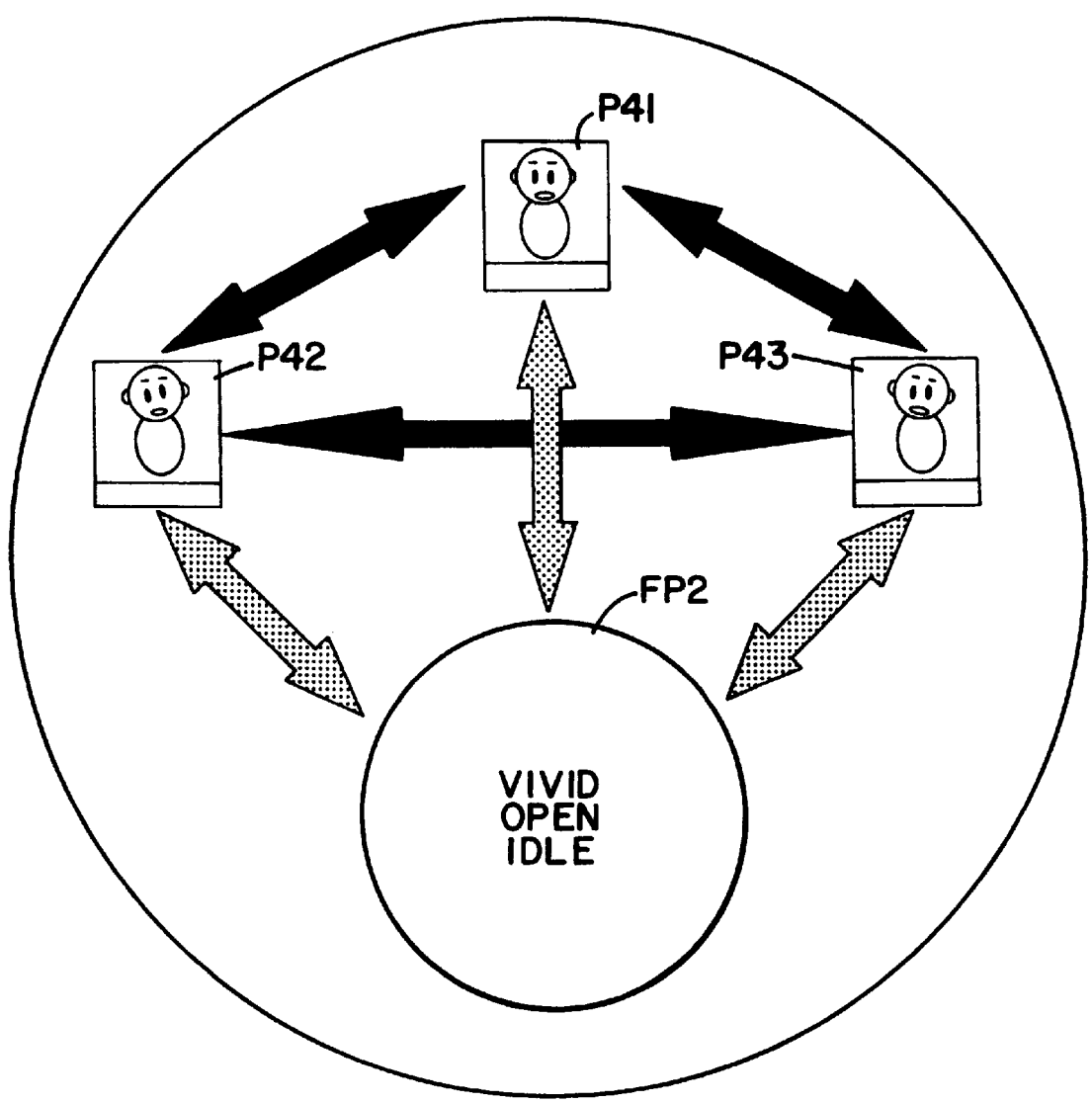
FIG. 25 is a state machine for handling situations when the identical open mouth inputs are repeated over a time according to one preferred embodiment of the current invention.

Referring to FIG. 25, in contrast to the above-described closed mouth idle patterns, open mouth idle patterns are described for continuous speech. When a performer continuously speaks or specifies the same auxiliary input for a predetermined amount of time, the open mouth repeated pattern is selected. Accordingly, the character as illustrated in P41, P42 and P43 each has an open mouth representation. P41 faces front while P42 and P43 respectively tilt their head to the left and the right. Among these head tilted positions, the characters may be animated to tilt its head as indicated by black arrows. On the other hand, when there is a repeated or continuous input for the predetermined amount of time, the character is animated according to an open mouth idle pattern FP2. Stippled arrows indicate the transitions to the open mouth idle pattern FP2.

Figure 26:
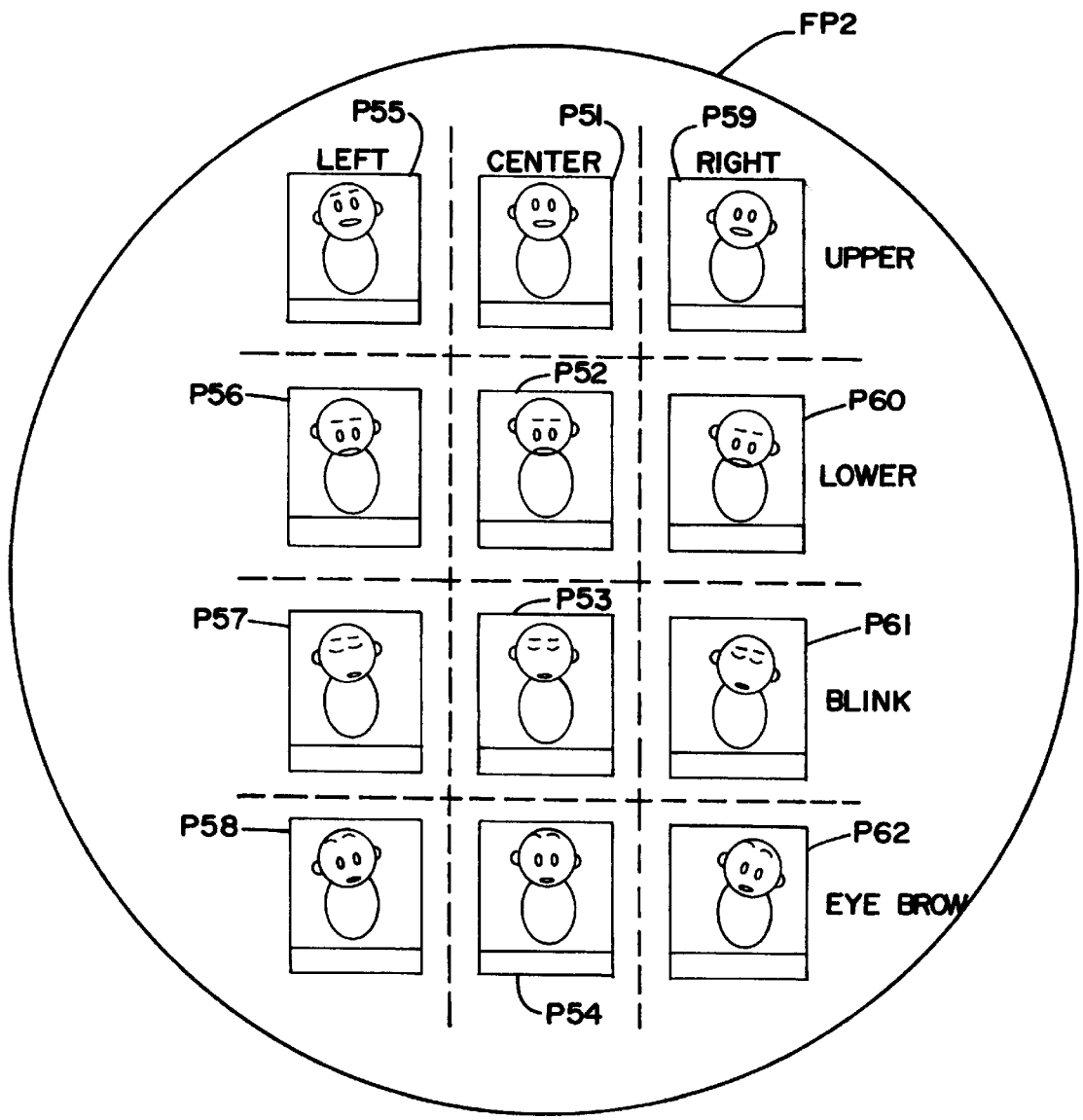
FIG. 26 illustrates example animation frames for the identical open mouth inputs are repeated for a predetermined time.

Now referring to FIG. 26, within the open mouth idle pattern mode FP2, examples of the above-mentioned open mouth idle patterns are illustrated according to one preferred embodiment of the current invention. When there is a continuous voice input for a predetermined time, according to one example of the open mouth idle pattern, a character's head is tilted in a predetermined way so as to approximate natural movements. According to this example, the head is tilted from the center in a counterclockwise direction and then in a clockwise direction. These movements enhance the character's vivid life-like appearance during the continuous speech or any other repeated animations. The first row including frames P55, P51 and P59 represents the above-described head tilt movement with open mouth while the eyes are upwardly directed. The second row including open mouth frames P56, P52 and P60 shows the natural head tilt movement while the eyes are open and looking downwardly. The third row including open mouth frames P57, P53 and P61 illustrates the same head tilt movement with closed eyes. The fourth row including open mouth frames P58, P54 and P62 illustrates the same head tilt movement with open eyes and the eyebrow movements. At least, one of these open mouth idle patterns is selected depending upon the current character representation when the predetermined amount of time elapses during a repeated input.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A computer graphics system for generating an animation sequence for a character in response to an input, comprising:

an animation database unit for storing predetermined animation frames of the character, a sequence of said animation frames generating movements associated with communication;

an input unit for inputting a voice input and a keypad input, said keypad input specifying additional predetermined characteristics of said animation sequence;

an animation status storage unit for storing a predetermined set of last input parameters;

an input analyzer connected to said input unit and said animation status storage unit for analyzing the voice input and the keypad input so as to determine said predetermined set of current input parameters in relation to said last input parameters, said input analyzer updating said last input parameters by said current input parameters; and an animation generator connected to said input analyzer and said animation database unit for generating a randomization input and for selecting a sequence of said animation frames based upon said current parameters and the randomization input so as to generate the animation sequence of the character.

2. The computer graphics system for generating an animation sequence according to claim 1 wherein said animation frames each contain a two dimensional image.

3. The computer graphics system for generating an animation sequence according to claim 1 wherein said animation frames each contain image data.

4. The computer graphics system for generating an animation sequence according to claim 1 wherein said current input parameters include a volume level and frequency information of said voice input.

5. The computer graphics system for generating an animation sequence according to claim 4 wherein said input analyzer further includes a voice input profile for adjusting said current input parameters based upon a predetermined characteristics.

6. A computer graphics system for generating an animation sequence for a character in response to an input, comprising:

an animation database unit for storing predetermined animation frames of the character, a sequence of said animation frames generating movements associated with communication;

an input unit for inputting a voice input and a keypad input, said keypad input specifying additional predetermined characteristics of said animation sequence;

a character profile storage unit for storing a predetermined set of character profile parameters, said character profile parameters characterizing the character during the communication;

a input analyzer connected to said character profile storage unit and said input unit for analyzing the input and the keypad input so as to determine a predetermined set of current input parameters in relation to said character profile parameters; and an animation generator connected to said input analyzer and said animation database unit for generating a randomization input and for selecting a sequence of said animation frames based upon said current parameters and the randomization input so as to generate the animation sequence of the character.

7. The computer graphics system for generating an animation sequence according to claim 6 wherein said character profile parameters include random generation parameters for customizing predetermined animation frames during a repetition of the input.

8. A computer graphics system for generating an animation sequence for a character in response to a voice input, comprising:

an animation database unit for storing predetermined animation frames of the character, a sequence of said animation frames generating movements associated with oral communication, said movements including lip movements which approximate those of a human speech;

an input unit for inputting a voice input and a keypad input, said keypad input specifying additional predetermined characteristics of said animation sequence;

a input analyzer unit connected to the input unit and for analyzing the voice input and the keypad input so as to determine a predetermined set of input parameter values; and an animation generator connected to said input analyzer and said animation database unit for generating a randomization input and for selecting a sequence of said animation frames based upon said input parameter values and the randomization input so as to generate said movements of the character associated with the voice input.

9. The computer graphics system for generating an animation sequence according to claim 8 wherein said input analyzer also analyzes an additional external input for determining an additional portion of said input parameters.

10. The computer graphics system for generating an animation sequence according to claim 8 wherein said input analyzer stores a current set of said input parameter values, said stored parameter values being defined as last parameter values.

11. The computer graphics system for generating an sequence according to claim 10 wherein said input analyzer compares said current parameter values to said last parameter values.

12. A method of generating an animation sequence for a character in response to an input, comprising the steps of:

a) storing predetermined animation frames of the character, a sequence of said animation frames generating movements associated with communication;

b) inputting a voice input and a keypad input, said keypad input specifying additional predetermined characteristics of said animation sequence;

c) analyzing the voice input and a keypad input so as to determine said predetermined set of current input parameters in relation to said last input parameters;

d) updating last input parameters based upon said current input parameters;

e) generating a randomization input for causing randomness in the animation sequence; and f) selecting a sequence of said animation frames based upon said current parameters and the randomization input so as to generate the animation sequence of the character.

13. The method of generating an animation sequence according to claim 12 wherein said animation frames each contain a two dimensional image.

14. The method of generating an animation sequence according to claim 12 wherein said animation frames each contain image data.

15. The method of generating an animation sequence according to claim 12 wherein said current input parameters include a fundamental wave, a volume level, a max pitch value, and a minimal pitch value of said voice input.

16. The method of generating an animation sequence according to claim 15 wherein said step c) further includes an additional step of adjusting said current input parameters based upon a predetermined characteristics using a voice input profile.

17. A method of generating an animation sequence for a character in response to an input, comprising the steps of:

a) storing predetermined animation frames of the character, a sequence of said animation frames generating movements associated with communication;

b) inputting a voice input and a keypad input, said keypad input specifying additional predetermined characteristics of said animation sequence;

c) storing a predetermined set of character profile parameters, said character profile parameters characterizing the character during the communication;

d) analyzing the voice input and the keypad input so as to determine a predetermined set of current input parameters in relation to said character profile parameters;

e) generating a randomization input for causing randomness in the animation sequence; and f) selecting a sequence of said animation frames based upon said current parameters and the randomization input so as to generate the animation sequence of the character.

18. A method of generating an animation sequence for a character in response to a voice input, comprising the steps of:

a) storing predetermined animation frames of the character, a sequence of said animation frames generating movements associated with oral communication, said movements including lip movements which approximate those of a human speech;

b) inputting a voice input and a keypad input, said keypad input specifying additional predetermined characteristics of said animation sequence;

c) generating a randomization input for causing randomness in the animation sequence; and d) analyzing the voice input and the keypad input so as to determine a predetermined set of input parameter values; and e) selecting a sequence of said animation frames based upon said input parameter values and the randomization input so as to generate said movements of the character associated with the voice input.

19. The method of generating an animation sequence according to claim 18 wherein said step d) further comprises an additional step of determining an additional portion of said input parameters based upon an additional external input.

20. The method of generating an animation sequence according to claim 18 wherein said step b) further comprises an additional step of storing a current set of said input parameter values, said stored parameter values being defined as last parameter values.

21. The method of generating a sequence according to claim 20 wherein said step b) further includes an additional step of comparing said current parameter values to said last parameter values.

* * * * *